(12) United States Patent
Entwistle et al.

(10) Patent No.: US 12,276,757 B2
(45) Date of Patent: Apr. 15, 2025

(54) SYSTEMS AND METHODS FOR TRACKING A POSITION OF A ROTATING PLATFORM OF A LIDAR SYSTEM

(71) Applicant: LG INNOTEK CO., LTD., Seoul (KR)

(72) Inventors: Mark Entwistle, New Egypt, NJ (US); Bayard G. Gardineer, IV, Princeton, NJ (US); Gary Burkholder, Morgan Hill, CA (US); Chris J. Trowbridge, Dexter, MI (US)

(73) Assignee: LG INNOTEK CO., LTD., Seoul (KR)

( * ) Notice: Subject to any disclaimer, the term of this patent is extended or adjusted under 35 U.S.C. 154(b) by 1007 days.

(21) Appl. No.: 17/180,260

(22) Filed: Feb. 19, 2021

(65) Prior Publication Data

US 2022/0268895 A1  Aug. 25, 2022

(51) Int. Cl.
  *G01S 7/481*   (2006.01)
  *G01B 7/30*    (2006.01)
  (Continued)

(52) U.S. Cl.
  CPC ............ *G01S 7/4817* (2013.01); *G01B 7/30* (2013.01); *G01D 5/145* (2013.01); *G01P 3/44* (2013.01);
  (Continued)

(58) Field of Classification Search
  CPC ...... G01D 5/14; G01D 2205/20; G01D 5/145; G01P 3/44; G01S 7/4817
  (Continued)

(56) References Cited

U.S. PATENT DOCUMENTS

| | | | |
|---|---|---|---|
| 5,861,745 A | * | 1/1999 | Herden ............... G01B 7/30 324/207.2 |
| 8,536,971 B1 | | 9/2013 | Waseem et al. |

(Continued)

FOREIGN PATENT DOCUMENTS

WO    2019133101 A2    7/2019

OTHER PUBLICATIONS

International Search Report of PCT/US2022/017031 dated Jun. 2, 2022, 3 pages.
(Continued)

*Primary Examiner* — Terrance L Kenerly
*Assistant Examiner* — Theodore L Perkins
(74) *Attorney, Agent, or Firm* — Birch, Stewart, Kolasch & Birch, LLP

(57) ABSTRACT

Systems and methods are provided herein for improved short range object detection in LiDAR systems. The associated systems may include a first portion and a second portion configured to rotate relative to one another. The system may also include a first magnet located on the second portion and arranged with a north pole of the first magnet facing a first direction. The system may also include a second magnet located on the second portion and arranged with a south pole of the second magnet facing the first direction. The system may also include a first sensor located on the first portion. The first sensor is further configured to measure a first magnetic field of the first magnet and a second magnetic field of the second magnet as the first portion and second portion rotate relative to one another.

17 Claims, 15 Drawing Sheets

(51) Int. Cl.
  *G01D 5/14* (2006.01)
  *G01P 3/32* (2006.01)
  *G01P 3/44* (2006.01)
  *G01S 17/931* (2020.01)
(52) U.S. Cl.
  CPC ........ *G01S 17/931* (2020.01); *G01D 2205/20* (2021.05); *G01P 3/32* (2013.01)
(58) Field of Classification Search
  USPC .......................................................... 310/68
  See application file for complete search history.

(56) References Cited

U.S. PATENT DOCUMENTS

| | | | |
|---|---|---|---|
| 2009/0033180 A1 | 2/2009 | Abe | |
| 2018/0106642 A1* | 4/2018 | Schliesch | H02K 11/215 |
| 2018/0123412 A1* | 5/2018 | Karplus | H02K 1/2795 |
| 2018/0342933 A1* | 11/2018 | Tangudu | G01D 5/145 |
| 2019/0074751 A1 | 3/2019 | Chen | |
| 2019/0181706 A1 | 6/2019 | Hellmuth et al. | |
| 2020/0106318 A1 | 4/2020 | Karplus et al. | |
| 2020/0136476 A1 | 4/2020 | Gassend et al. | |

OTHER PUBLICATIONS

Written Opinion of PCT/US2022/017031 dated Jun. 2, 2022, 4 pages.
LSLIDAR, "LSLIDAR Product Guide," LeiShen Intelligent System Co., Ltd, https://globalgpssystems.com/wp-content/uploads/2021/06/Leishen-LiDAR-Product-Guide-6.60719.pdf, 2021, pp. 1-23.

* cited by examiner

1500

1502
Receiving from a first sensor, as a first portion of a LIDAR assembly rotates relative to a second portion of the LIDAR assembly, a first magnetic field measurement associated with a first magnetic field of a first magnet, wherein the first magnet is located on the second portion and arranged with a north pole of the first magnet facing a first direction, wherein a second magnet is located on the second portion and arranged with a south pole of the second magnet facing the first direction, wherein the first sensor is located on the first portion, wherein the first sensor is further configured to measure the first magnetic field of the first magnet and a second magnetic field of the second magnet as the first portion rotates relative to the second portion 1504
Receiving a second magnetic field measurement associated with the magnetic field of the second magnet from the first sensor 1506
Calculating a position of the first sensor relative to the second portion based on the first magnetic field measurement and the second magnetic field measurement

FIG. 15

SYSTEMS AND METHODS FOR TRACKING A POSITION OF A ROTATING PLATFORM OF A LIDAR SYSTEM

TECHNICAL FIELD

The present disclosure relates to Light Detection and Ranging (LIDAR) systems and more specifically, detector devices in LIDAR systems.

BACKGROUND

LIDAR systems may be used for various purposes. For example, a LIDAR system may be incorporated with a vehicle (such as an autonomous or semi-autonomous vehicle) and may be used to provide range determinations for the vehicle. That is, the vehicle may traverse an environment and may use the LIDAR system to determine the relative distance of various objects in the environment relative to the vehicle. This may be accomplished by emitting light from an emitter device of the LIDAR system into the environment, and detecting return light from the environment (for example, after reflecting from an object in the environment) using a detector device of the LIDAR system. Based on an amount of time that elapses between the time at which the light is emitted and a time at which the return light is detected (for example, a "Time of Flight" of the light), it may be determined how far an object is from the LIDAR system. Additionally, the one or more emitter devices and one or more detectors may be housed in a rotating portion of the LIDAR system, such that light may be emitted and return light may be detected in various directions around the LIDAR system as the rotating portion of the LIDAR system rotates relative to the fixed portion. This may allow the vehicle to ascertain distance information for objects located within a full 360 degree field of view of the vehicle, rather than only in one direction that the one or more emitter devices and/or one or more detector devices are pointing. It may be important for information pertaining to the rotation of the rotating portion of the LIDAR system to be readily available for a number of reasons. For example, this may allow the vehicle to determine a direction in which any given light emission and/or any given detected return light was directed and/or originated from. Without this information associated with the rotation of the LIDAR system, the LIDAR system may produce inaccurate distance information that may impact the functionality of the vehicle.

In some cases, information associated with the rotation of the rotating portion of the LIDAR system may be obtained through the use of optical components. For example, this approach for obtaining this information may involve the use of a light emitter (such as a light emitting diode (LED)) and a light detector (such as a photodetector). The light emitter may be placed at a known location on a second portion the LIDAR assembly and the light detector may be placed on a first portion of the LIDAR assembly, where the second portion may rotate relative to the first portion. The light emitter may be continuously emitting light at a given rate, such that the photodetector may be able to determine when the light emitter is at the location of the photodetector by detecting the light emitted by the light emitter. This detection may provide information about times at which the known location of the light emitter on the first portion has reached the known location of the photodetector on the second portion. However, a downside of this optical system approach is that contaminants may enter the optical elements (for example, the light emitter or the photodetector), which may hinder the ability of the photodetector to detect emitter light, or the ability of the light emitter to emit light. This may result in inaccurate or suboptimal information relating to the rotation of the rotating assembly.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 15 depicts a method, in accordance with one or more example embodiments of the disclosure.

DETAILED DESCRIPTION

Figure 1:
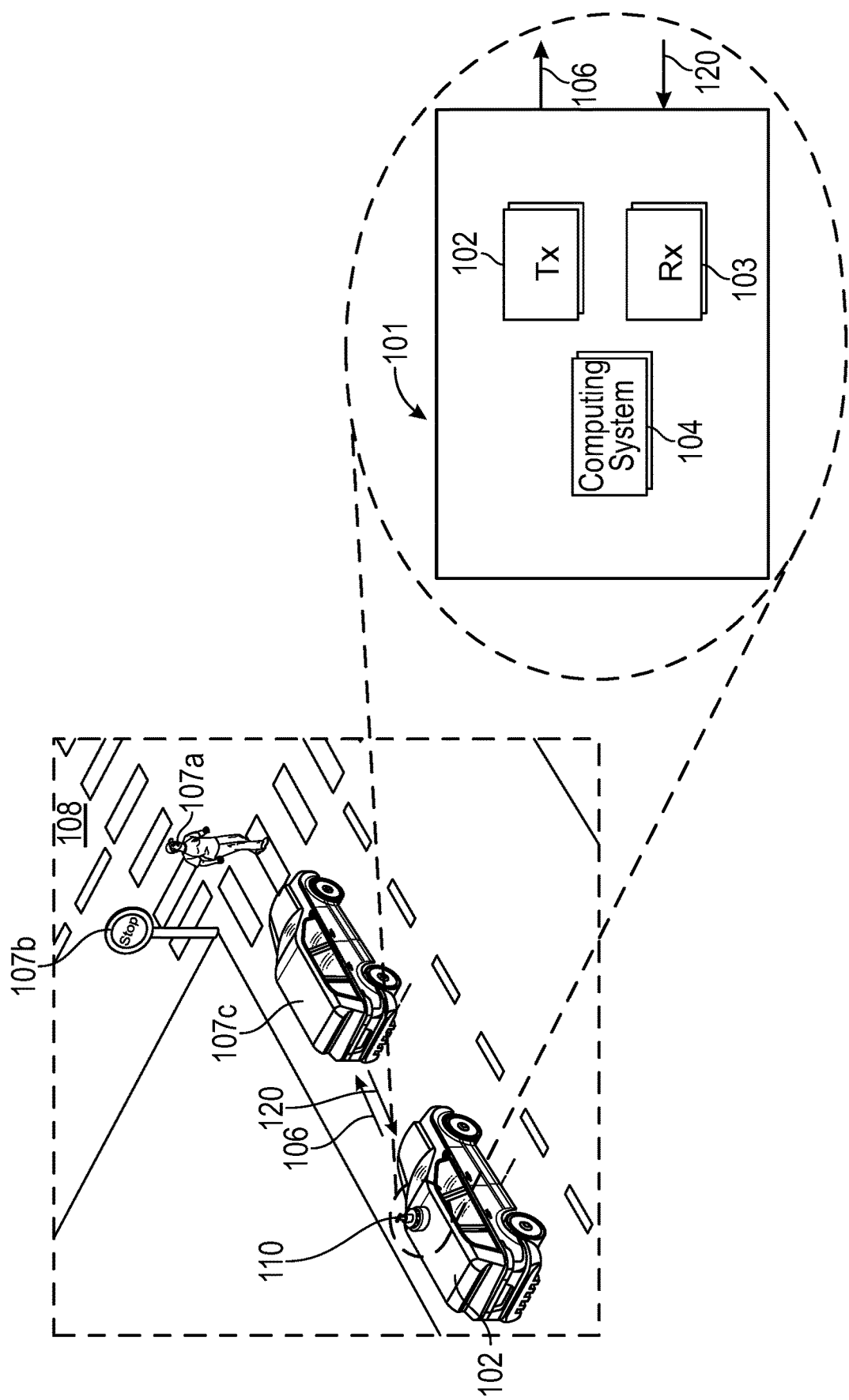
FIG. 1 depicts a schematic of an illustrative LIDAR vehicle system, in accordance with one or more example embodiments of the disclosure.

This disclosure relates to, among other things, systems and methods for tracking a current position of a given point on a rotating platform in a LIDAR assembly. More particularly, the systems and methods described herein may pertain to tracking a current azimuth angle of a rotating portion of a LIDAR (which may also be referred to as a "LIDAR system," "LIDAR assembly," or the like herein). An azimuth angle may refer to an angle between two imaginary vectors on the LIDAR. For example, a first imaginary vector may be a reference vector that may represent a starting position of the rotating portion of the LIDAR. A second imaginary vector may be a vector representing a current position of the LIDAR after it has begun performing a rotation. The azimuth angle in this case may refer to a degree of separation between the two imaginary vectors. For example, if the reference vector is designated as a 0 degree point and the second vector represents the rotating portion having rotated by 15 degrees, then the azimuth angle may represent the 15 degrees of rotation. The systems and methods described herein may also pertain to tracking other operational parameters of the LIDAR based on this location information, such as a rotational speed of the LIDAR, among other operational parameters (these additional operational parameters may be described in additional detail below).

In some embodiments, the LIDAR may include at least a base, a sensor body, and a motor. The motor may include a stator, a rotor, and a shaft affixed to the rotor. The stator may be configured to drive the rotor in rotation. The motor may be affixed to the base and sensor body such that the motor may be able to rotate the sensor body with respect to the base. That is, the "rotating portion" of the LIDAR may refer to the rotor as well as any elements that may rotate along with the rotation of the rotor. The stator may also be affixed to a motor housing, which may be affixed to the base, while the shaft may be affixed to the sensor body (or in some cases, the sensor body may alternatively be affixed to the rotor instead of being affixed to the shaft). The sensor body may include one or more emitter devices and one or more detectors, such that light may be emitted and return light may be detected in various directions around the LIDAR system as the sensor body of the LIDAR system rotates relative to the base. This may allow the vehicle to ascertain distance information for objects located within a full 360 degree field of view of the vehicle, rather than only in one direction that the one or more emitter devices and/or one or more detector devices are pointing. In some cases, the sensor body may also include any other electronics associated with the LIDAR system as well. It may be important for information pertaining to the rotation of the rotating portion of the LIDAR system to be readily available for a number of reasons. For example, this may allow the vehicle to determine a direction in which any given light emission and/or any given detected return light was directed and/or originated from. Without this information associated with the rotation of the LIDAR system, the LIDAR system may produce inaccurate distance information that may impact the functionality of the vehicle. While the above example includes a specific application of the systems and methods described herein in association with a LIDAR assembly, the systems and methods described herein may also be used for purposes of tracking the position of a reference point on a rotating portion of a rotating assembly relative to a fixed portion of the rotating assembly in any other context as well (for example, in any motors that include a stator and a rotor, or any other types of rotating assemblies).

In some embodiments, the systems and methods described herein may utilize a combination of magnets and sensors capable of measuring magnetic fields to obtain data relating to the rotation of a rotating assembly as described above. The use of magnets for this purpose may be advantageous over other approaches for tracking the rotation of the rotating assembly, such as approaches that use optical components as described above. For example, these optical solutions may involve the use of a light emitter (such as a light emitting diode (LED)) and a light detector (such as a photodetector). The light emitter may be placed at a known location on a second portion the LIDAR assembly and the light detector may be placed on a first portion of the LIDAR assembly, where the second portion may rotate relative to the first portion. The light emitter may be continuously emitting light at a given rate, such that the photodetector may be able to determine when the light emitter is at the location of the photodetector by detecting the light emitted by the light emitter. This detection may provide information about times at which the known location of the light emitter on the first portion has reached the known location of the photodetector on the second portion. However, a downside of this optical system approach is that contaminants may enter the optical elements (for example, the light emitter or the photodetector), which may hinder the ability of the photodetector to detect emitter light, or the ability of the light emitter to emit light. This may result in inaccurate or suboptimal data relating to the rotation of the rotating assembly.

In contrast to this approach using optics, the use of magnetic and magnetic field sensors may be less susceptible to contaminants, as the contaminants may have less of an impact on the magnetic field of the magnets, and the ability of the sensors to detect the magnetic fields, than they may have on the ability of optical elements to emit and/or detect light. It should be noted that the use of the terms "first portion" and "second portion" may be used to describe either the rotating or the fixed portion of the LIDAR assembly. That is, the description provided herein may, for simplicity sake, refer to the first portion as the fixed portion of the LIDAR assembly, the first portion may also likewise refer to the rotating portion of the LIDAR assembly in some cases as well. The same may also apply for the second portion of the LIDAR assembly as well.

Turning to the LIDAR assembly itself, a first portion of the LIDAR assembly may include one or more magnets. The first portion of the LIDAR assembly may be a fixed portion of the LIDAR assembly (such as a stator of the LIDAR assembly). For simplicity purposes, this disclosure may primarily refer to a configuration in which the first portion of the rotating platform is fixed and the magnets are positioned on this fixed portion of the LIDAR assembly. However, it should be noted that this configuration is not intended to be limiting, and any other configuration may similarly apply. For example, the magnets may also be placed in the rotating portion of the LIDAR assembly as well. The one or more magnets may be arranged on the first portion of the rotating platform at known locations and at known spacing intervals with respect to one another. For example, the magnets may be arranged in a circular fashion around a circumference of the first portion as depicted in FIGS. 4-7. The circle formed by the arrangement of the magnets may be of any varying diameter. Additionally, the magnets may also be arranged in any other physical arrangement as well besides a circular arrangement.

In some embodiments, the magnets may be arranged with a first group of magnets having a magnetic north pole facing in a first direction and a second group of magnets having a magnetic south pole facing in the first direction. Likewise, the magnetic south pole of the first group of magnets may face a second direction and the magnetic north pole of the second group of magnets may face the second direction. For example, if the first portion of the LIDAR assembly is in the shape of a disc as depicted in the figures, then the first direction may be facing radially towards the center of the disc and the second direction may be facing radially away from the center of the disc. Magnets in the first group of magnets and magnets in the second group of magnets may be arranged such that every other magnet is in the first group of magnets. That is, the magnets may be arranged in an alternating fashion with every other magnet having a magnetic north pole facing in the first direction. This arrangement of magnets with alternating magnetic pole directions may influence the magnetic fields produced by the magnets, such that a sensor passing by the successive magnets in the arrangement would produce a magnetic field plot in the shape of a sine wave. This may be advantageous for a signal processing purposes as may be described in further detail below (for example, for purposes of identifying zero-crossings of magnetic field data associated with the magnets). Additionally the arrangement of the magnets may not necessarily be limited to every other magnet having a magnetic north pole facing in the first direction. For example, in some embodiments, the magnets may alternate in pairs or groups, such that more than one adjacent magnet has a magnetic north pole facing the first direction before a magnet with a magnet including a magnetic south pole facing the first direction is provided in the arrangement.

In some embodiments, the one or more magnets may be arranged in equal intervals such that the physical spacing between individual magnets on the first portion of the LIDAR assembly may be equivalent. Arranging the magnets in this manner may be advantageous because it may simplify signal processing of magnetic field data produced with respect to the magnets as the spacing intervals may be a fixed constant. However, in some cases, the physical spacing between individual magnets may not necessarily be equivalent. This may be a result of intentional unequal spacing, or may be the product of intrinsic irregularities that may naturally exist in such an arrangement.

In some embodiments, intentional unequal spacing may be provided between some or all of the magnets for a number of reasons. For example, a particular section of magnets may be physically spaced apart by a different distance than the remainder of the magnets in the LIDAR assembly in order to create a unique sector in the magnets. This unique sector may correspondingly produce a unique sector in the magnetic field waveforms measured by the sensors as they pass over the unique sector in the magnets. The unique sector may then be used to identify when the LIDAR assembly has made a complete rotation. That is, every time the unique magnet sector is identified through the unique sector of the magnetic field waveforms, it may be determined that a full rotation has been made. The use of this unique magnet sector to identify a full rotation of the LIDAR assembly may be an alternative to using the index magnet to identify when a full rotation has completed, as is described herein. In some cases, the unique magnet sector may be used in conjunction with the index magnet. For example, it may be desired to more easily be able to identify when the rotation of the LIDAR assembly has reached any amount of rotation before a full rotation has been made. In some cases, any number of unique sectors may be established by providing intentional unequal spacing in some of the magnets. In addition to intentional unequal spacing between some or all of the magnets, unintentional unequal spacing may occur because it may be difficult to provide an exactly equal spacing interval between all of the individual magnets (for example, due to manufacturing inconsistencies). Even if the spacing irregularities are minuscule, this may be problematic because data accuracy in contexts such as autonomous vehicle navigation may be critical. Thus, in cases where the spacing between magnets is not a constant value it may be advantageous for information about individual spacing intervals between some or all of the magnets to be stored. For example, a look-up table including some or all of the spacing intervals between individual magnets in a LIDAR assembly may be stored. The look-up table may be stored locally to the system associated with the LIDAR assembly (for example, in a LIDAR system), or may also be stored remotely from the system (for example, at a remote server). In this manner, the exact spacing between specific magnets included in the LIDAR assembly may be obtained, which may improve signal processing accuracy associated with magnetic field data ascertained from the magnets.

Figure 8:
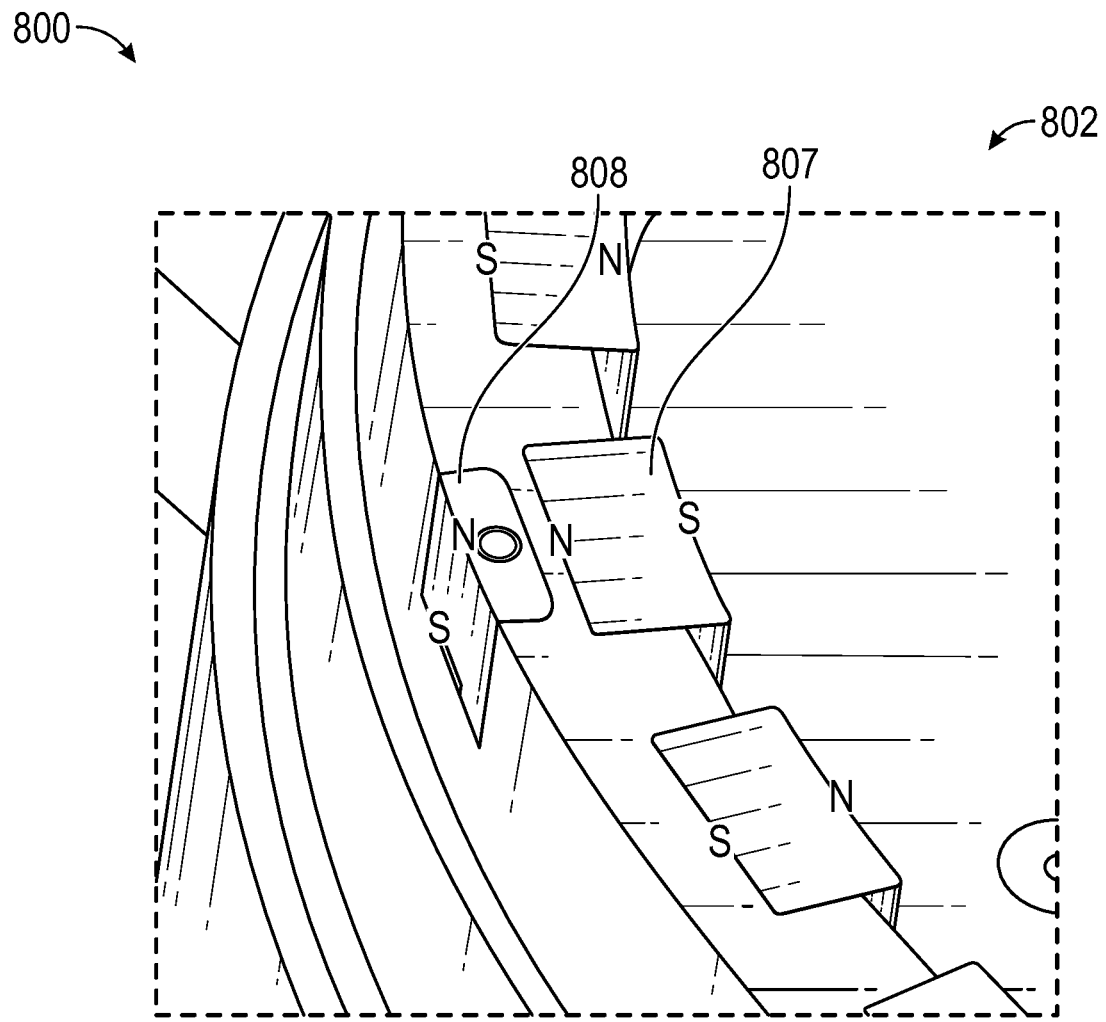
FIG. 8 depicts an example orthogonal view of the first portion of the LIDAR assembly, in accordance with one or more example embodiments of the disclosure.

In some embodiments, the first portion of the LIDAR assembly may also include one magnet that is unique from the other magnets included in the arrangement. This magnet may be referred to herein as an "index magnet," and may be used as a reference point to identify every time the first portion of the LIDAR assembly has made a complete 360 degree revolution. That is, every time a magnetic field of the index magnet is registered (for example, a magnetic field of the index magnet is detected at a certain level), it may be determined that the full rotation of the LIDAR assembly has been achieved. To allow the index magnet to be distinguished from the other magnets included in the arrangement in terms of its magnetic field data, the index magnet may be provided further outwards on the first portion of the LIDAR assembly than the other magnets (or otherwise spatially separated from the other magnets). Additionally, the index magnet may be positioned orthogonally relative to the other magnets. For example, if the north and south poles of the magnets are facing a lateral direction, the north and south poles of the index magnet may be vertically-facing (FIG. 8 provides a close up example of the orientation of the index magnet). This may cause the magnetic field of the index magnet to be directed in a different direction than the magnetic fields of the other magnets included in the arrangement. It should be noted that any of the details pertaining to the arrangement of any of the magnets described above is not intended to be limiting, and any other configuration may also be applicable as well.

In some embodiments, the second portion of the LIDAR assembly may include one or more sensors. The second portion of the LIDAR assembly may be the rotor, for example. The one or more sensors may include Hall effect sensors, for example, which may be sensors that are capable of measuring the magnitude of a magnetic field. The one or more sensors may be used to measure the magnetic fields of the magnets included on the first portion of the LIDAR assembly. Given that the locations of the one or more sensors on the second portion of the rotating platform may be fixed and the locations of the magnets on the first portion of the rotating platform may also be fixed, using the sensors to identify magnetic fields produced by specific magnets may provide an indication of a current location of a sensor relative to a location on the first portion of the LIDAR assembly. That is, the one or more sensors may be arranged such that when the second portion of the LIDAR assembly rotates relative to the first portion of the LIDAR assembly, the sensors positioned on the second portion of the LIDAR assembly detect the magnetic fields produced by the magnets positioned on the first portion of the LIDAR assembly.

The one or more sensors may also include any other type of sensor other than magnetic field sensors as well. For example, the one or more sensors may also include sensors used to measure temperature. Temperature sensors may be included to measure the ambient temperature of the environment of the LIDAR assembly. More particularly, the temperature sensors may be used to determine the temperature of any of the magnets included in the LIDAR assembly. Knowing the temperature of the magnets may be important because the magnetic fields produced by these magnets may be impacted based on the temperature of the magnets. For example, the amplitudes of the magnetic fields produced by the magnets may increase or decrease based on the temperature of the magnets. Thus, the temperature information may be used to account for any corresponding changes in amplitude (or other changes) that may occur in the magnetic fields based on temperature. This information may be used during analysis of the magnetic field waveforms produced by the magnetic field sensors measuring the magnetic fields of the magnets, as may be illustrated by FIGS. 13-14.

In some embodiments, one of the sensors, which may referred to herein as the "index sensor," may be a sensor that may specifically be used to detect the magnetic field of the index magnet described above Similar to the other sensors, the index sensor may also be located on the second portion of the LIDAR assembly. The index sensor may also be of the same or a similar type of sensor as the other sensors arranged on the second portion of the LIDAR assembly. That is, the index sensor may be a Hall effect sensor or any other type of sensor capable of capturing magnetic field data. However, the index sensor may differ from the other sensors in that the index sensor may be positioned further away from the center of the second portion of the rotating platform than the other sensors arranged on the second portion of the LIDAR assembly (however, in some embodiments, the index sensor may also be positioned anywhere else on the second portion of the LIDAR assembly). Additionally, the index sensor may be oriented at a 90 degree offset from the orientation of the other sensors. That is, the physical orientation of the index sensor, and thus the orientation of the magnetic field produced by the index sensor, may be orthogonal relative to the other sensors of the LIDAR assembly. This may allow for the data produced by the index sensor to be distinguishable from the data produced by the other sensors, which may allow for the system to separately identify every instance in which the index magnet is passed by the index sensor. The magnetic field data produced by the index sensor may also have an amplitude that may be greater than the data produced by the other magnetic field sensors. This may be because the index magnet that the index sensor may be used to measure may produce an additive magnetic field due to the magnetic fields of other magnets that may exist nearby the index magnet. In this manner, the index sensor and index magnet may be used to identify when the LIDAR assembly has undergone a full 360 degree rotation. That is, if the index sensor is in a fixed position on the second portion of the LIDAR assembly and the index magnet is in a fixed position on the first portion of the LIDAR assembly, then every instance of the index sensor detecting the magnetic field of the index magnet may be indicative of a full rotation of the LIDAR assembly.

Figure 9:
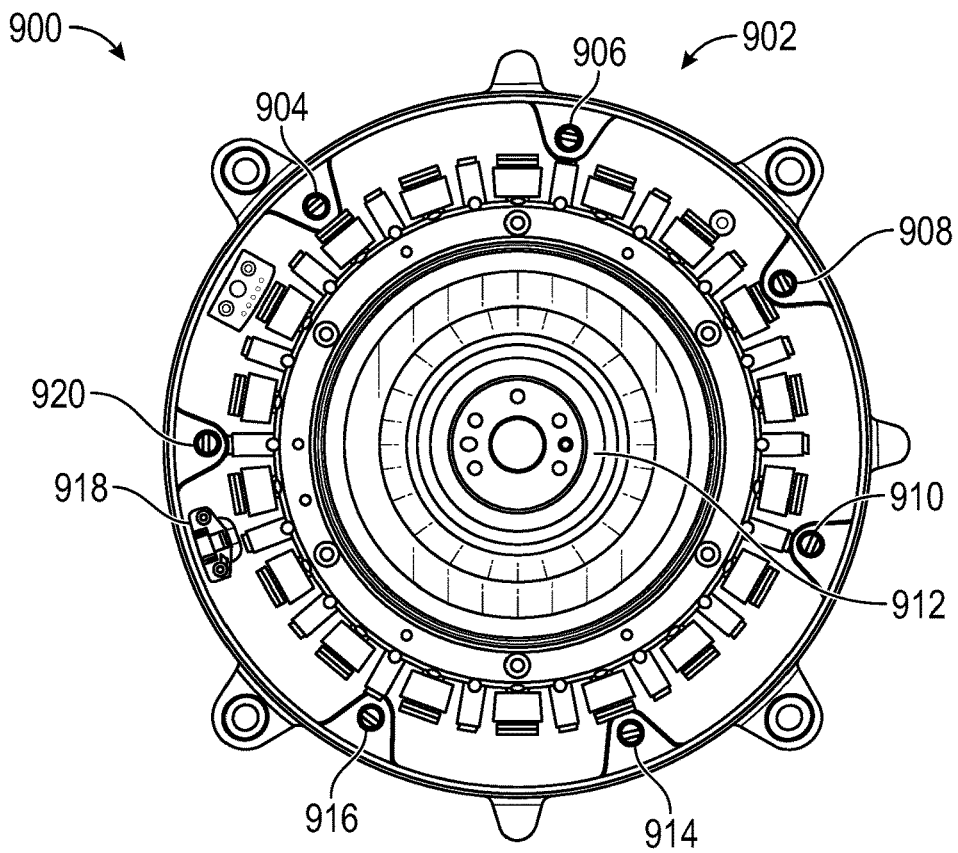
FIG. 9 depicts an example bottom-up view of a second portion of the LIDAR assembly, in accordance with one or more example embodiments of the disclosure.

In some embodiments, the magnetic field data produced by the sensors may be analyzed by signal processing elements (these signal processing elements and the analysis they perform may be described in more detail with respect to FIGS. 1 and 8-9, for example) within the LIDAR system to track one or more operational parameters associated with the operation of the LIDAR assembly. For example, the magnetic field data may be used to track a given point on the second portion of the LIDAR assembly relative to a reference point on the first portion of the LIDAR assembly at any given time (in other words, the data may be used to identify an azimuth angle of the rotating portion of the LIDAR assembly at any given time). As a second example, the data may be used to determine a speed at which the rotating portion of the LIDAR assembly is rotating. The data may also be used to track any number of other types of operational parameters associated with the LIDAR assembly as well. Given that the second portion of the LIDAR assembly (for example, the rotor) may be affixed to the shaft along with the sensor body, if operational parameters of the second portion of the rotating platform are known, then these operational parameters may apply to the sensor body as well. That is, because the second portion and sensor body may be affixed to the same rotating shaft, they may rotate at the same rate.

By the nature of the particular arrangement of the magnets and the sensors as described above, the output of the sensors may be in the form of sine waves (however, in other cases, the output may be in the shape of any other waveform as well). This may be because the arrangement of the magnets in alternate north/south pole directions may cause a sensor to measure positive and negative magnetic fields at every other magnet that the sensor passes. Thus, the magnetic field data produced by the sensor may alternate between positive and negative values, which may result in the sine wave output. For example, depending on the configuration of the sensors, when a sensor passes by a magnet with a north pole facing in one direction, the sensor may produce a positive magnitude magnetic field value. Likewise, when the sensor passes by a magnet with a south pole facing in the one direction, the sensor may produce a negative magnitude magnetic field value. This explanation is only intended to be exemplary, however, and the magnets with a north pole facing in the one direction may produce negative magnitude data (and/or the magnets with a south pole facing in the one direction may produce positive magnitude data). Additionally, this configuration of alternating north/south pole direction magnets may also merely be exemplary, and the form that the output data from the sensors takes may depend on the particular arrangement of the magnets and the sensors that is actually implemented.

In some embodiments, the analysis performed by the signal processing elements may involve identifying zero-crossings in the magnetic field data. This may be depicted in FIGS. 13-14 and described in more detail below with respect to those figures. A zero-crossing may refer to a point at which a plot of the magnetic field data versus time crosses the x-axis of the plot. This may also be referred to as a "null point." The zero-crossing may represent a point at which a given sensor is located in between two different magnets of opposite polarities. The magnetic field data produced by the sensor shifts from either positive to negative or negative to positive magnetic field data as the sensor readings shift from a magnet of one polarity to a magnet of another polarity (for example, from a magnet with a magnetic north pole facing in one direction to a magnet with a magnetic south pole facing the one direction). Thus, by identifying the location of the zero-crossings of the magnetic field data, it may be possible to determine when a sensor is located in a space between two alternating magnets. If information pertaining to the magnets and their arrangement on the first portion of the LIDAR assembly is known (for example, the number of magnets, their spacing relative to one another, etc.), then an amount of distance that the sensor has rotated relative to a starting position may be determined using the zero-crossing information. As one non-limiting example, if the second portion of the LIDAR assembly includes an arrangement of 30 total magnets, with half being oriented with their north poles facing in one direction, and half being oriented with their south poles facing in the one direction, then a full 360 rotation of the sensor may produce a total of 15 sine waves (that is 15 sine waves may be produced per revolution of the first portion of the LIDAR assembly. These numbers are merely exemplary, and the same determinations may be made regardless of the number of magnets. For example, if 40 magnets are used, then the sensor may produce a total of 20 sine waves per revolution instead of 15.

In some embodiments, multiple sensors may be arranged on the second portion of the LIDAR assembly. The one or more sensors may be positioned on the second portion of the LIDAR assembly in line with the magnets on the first portion of the LIDAR assembly. That is, the one or more sensors may be positioned such that as the second portion rotates relative to the first portion, the one or more sensors pass over the magnets. This may allow the one or more sensors to effectively obtain magnetic field data from the magnets. In some cases, it may be desirable to place the one or more sensors as close to the magnets as possible. To accomplish this, the second portion may include one or more holes (for example, holes 1212 depicted in FIG. 12) that may allow the one or more sensors to be directly exposed to the magnets on the first portion. The sensors may also be arranged equally-spaced apart from one another around the circumference of the second portion of the LIDAR assembly. However, the sensors may also be arranged in any other manner, such as in non-equal spacing intervals or in locations other than the circumference of the first portion. Including multiple of these sensors may allow for multiple sine waves to be produced for a full rotation of one of the sensors. This may provide additional data resolution and may also allow for enhanced confidence in the magnetic field data being produced by any given sensor. For example, if one only sensor is used, then it may be difficult to ascertain whether the data being produced by the one sensor is accurate. However, by introducing multiple sensors, the data produced by each of the sensors may be compared to identify any faulty data being produced by any of the individual sensors. In some embodiments, the sensors may be equally-spaced apart in order to produce a phase relationship between the sine waves formed by the output magnetic field measurements of the individual sensors. That is, if the individual sensors are equally spaced apart physically, then the sine waves produced by the individual sensors may be equally time shifted along an x-axis of the plots. This, in turn, may provide an equal interval between each of the zero-crossings of the sine waves associated with the individual sensors. The equal intervals may allow for simplicity in the processing of the sine waves. In some embodiments, it may also be possible to process the output sine wave of the sensors using data points other than the zero crossings of the sine waves. For example, data points such as the amplitudes, slopes, minimum and maximum points, or any other reference points along the plots may also be used. However, using the zero-crossing instead of these other potential data points may be advantageous because the strength of the magnets and the corresponding magnitude of the magnetic fields they produce may vary depending on various factors, such as the temperatures the magnets are exposed to. That is, the magnetic fields of the magnetics may weaken depending on the temperature. Consequentially, the amplitude value of one magnet at a first temperature may be different than the amplitude value of the same magnet at a different temperature. Thus, if data points such as amplitude were used, the signal processing may need to take these changes into account. Even if the signal processing were able to accurately take into account the effect of the temperature changes on the amplitude of the measured magnetic fields, this would also have the downside of increasing signal processing complexity required to make the same determinations with respect to location tracking. In contrast, using the zero-crossings of the data output plots may mitigate or eliminate these magnet-specific variations. For example, if a threshold were used to identify various amplitudes of the sine waves, then a temperature variation in one magnet may cause an amplitude to fall below the threshold and result in that particular magnet not being registered. However, regardless of any magnetic field variations based on temperature or otherwise, based on the alternating polarity configuration described herein (for example, one magnet with magnetic north facing one direction and an adjacent magnet with magnetic south facing that direction), the number of zero-crossings may remain constant because the magnetic field data may always transition from one polarity to another.

In some embodiments, if the number of sine waves per revolution of a given sensor on the second portion of the LIDAR assembly is known, and the starting point at which the rotation of the first portion begins is also known, then the azimuth angle of the sensor relative to its starting position may also be ascertained by determining the number of zero-crossings that have taken place since the last instance at which the sensor was located at its starting position. For example, if there are 40 magnets in the second portion, then it may be determined that the sensor has made approximately a half revolution once 10 zero crossings have been identified. The accuracy of these sensor location determinations may further be improved as well. A first accuracy improvement may be possible by using an equal (or known) spacing between each of the magnets. A second accuracy improvement may be possible by increasing the number of magnets included in the second portion of the LIDAR assembly. By increasing the number of magnets, the data resolution (for example, the number of data points per revolution) may be increased, which may provide more data about the potential location of the sensor relative to its starting position. An increase in the number of magnets may also result in a decrease in the amount of spacing between each of the magnets, so the distance the sensor may travel before receiving a data point may be reduced.

In some embodiments, the analysis of the magnetic field data produced by the sensors may be performed using digital signal processing as described above. However, in some embodiments, the analysis of the magnetic field data may also be performed by analog circuitry as well. For example, one or more analog comparator circuits may be used to determine the zero-crossings of the magnetic field data. A first analog comparator circuit may be used to identify when a magnetic field signal is less than zero and a second analog comparator circuit may be used to identify when a magnetic field signal is greater than zero. The use of these two comparator circuits in combination may then be used to determine when the signal transitions between being less than zero and above zero. This transition time may correspond to the zero-crossing of the waveform that may otherwise be determined using digital signal processing as described herein. However, any other types of analog circuitry may also be used to achieve the same result.

In some embodiments, using the location information for a given sensor, and timing information associated with the time at which the sensor is at different locations relative to its starting position, other operational parameters relating to the operation of the LIDAR assembly may also be obtained. For example, using the position data and the time data at two or more data points, a rotational speed of the LIDAR assembly may be determined. Additional information about the operation of the LIDAR assembly may also be determined. For example, torque ripple (which may be a periodic increase or decrease in output torque as the rotor shaft rotates) may be detected. As a second example, the data produced by the magnetic field measurements may also be used to determine if any of the magnets are becoming less effective. This may be accomplished by analyzing the amplitude of the magnetic fields produced by the various magnets. A decreasing magnetic field may be an indicator that a particular magnet is weakening. These are just a few examples of the types of information that may be gleaned from the magnetic field data measured as described herein, and any other types of information may also be determined.

In some embodiments, a calibration of the system may also be performed to ensure that accurate calculations are performed using the magnetic field data obtained from the one or more sensors. Over time certain parameters associated with the magnets and/or the sensors in the system may change. For example, different poles of the magnets may get weaker over time, mechanical shifts may occur in the positioning of the magnets, or any other type of change may take place that may impact the properties of the magnets. These changes may impact the accuracy of the determinations being made based on the data produced by the sensors. To account for these changes, calibration of the system may be performed at certain intervals. This calibration may involve collecting data points for a given number of revolutions of the LIDAR assembly at a fixed speed. The data points may be used to determine a current angular interval between each of the magnets in the arrangement of magnets in the LIDAR assembly. An angular interval may refer to a degree of rotation that the LIDAR assembly may need to undergo for a reference point on the assembly to pass between two of the magnets. Additionally, if the rotational speed of the LIDAR assembly is kept fixed, time intervals between each of the magnets may also be obtained. A time interval, may refer to an amount of time that may elapse before the reference point on the assembly passes between the two magnets to continue the same example provided above. This time interval may only be applicable when the rotational speed of the LIDAR assembly is the same as the rotational speed during which the time interval was measured. That is, the time interval may change depending on the rotational speed of the LIDAR assembly. In some cases, if a look-up table is used. The data included within the look-up table may be updated after a new calibration is performed.

With reference to the figures, FIG. 1 depicts a schematic of an illustrative LIDAR system 101. In some embodiments, the LIDAR system 101 may include at least one or more emitting devices 102, one or more detector devices 103, and/or one or more computing systems 104. The LIDAR system 101 may also optionally include one or more emitter-side optical elements and/or one or more receiver-side optical elements. Additionally, external to the LIDAR system 101 may be an environment 108 that may include one or more objects (for example object 107a and/or object 107b). Hereinafter, reference may be made to elements such as "emitting device," "detector device," "circuit," "controller," and/or "object," however such references may similarly apply to multiple of such elements as well.

In some embodiments, an emitting device 102 may be a laser diode for emitting a light pulse (for example, emitted light 106). A detector device 103 may be a photodetector, such as an Avalanche Photodiode (APD), or more specifically an APD that may operate in Geiger Mode (however any other type of photodetector may be used as well). The detector device 103 may be used to detect return light 120 from the environment 108. The return light 120 may be based on the emitted light 106. That is, the emitting device 102 may emit light into the environment 108, the light may reflect from an object in the environment, and may return to the LIDAR system 101 as return light 120. It should be noted that the terms "photodetector" and "detector device" may be used interchangeably herein. The computing system 104 (which may be the same as computing system 1600, and may also be referred to herein as "signal processing elements," "signal processing systems," or the like) that may be used to perform any of the operations associated with the LIDAR assembly or otherwise. For example, the computing system 104 may be used to perform signal processing on magnetic field data received by one or more sensors (for example, any of the sensors described with respect to FIGS. 2-4 and 9-11, as well as any other sensors described herein) on a LIDAR assembly of the LIDAR system, as well as any other operations associated with the LIDAR system 101. Finally, an object 107a and/or 107b may be any object that may be found in the environment 108 of the LIDAR system 101 (for example, object 107a may be a vehicle and object 107b may be a pedestrian, but any other number or type of objects may be present in the environment 108 as well).

In some embodiments, any of the elements of the LIDAR system 101 (for example, the one or more emitting devices 102, one or more detector devices 103, and/or one or more computing systems 104, as well as any other elements of the LIDAR system 101) may be included within a LIDAR assembly 110 as described herein. The LIDAR assembly 110 may include at least a base, a sensor body, and a motor. The motor may include a stator, a rotor, and a shaft affixed to the rotor. The stator may be configured to drive the rotor in rotation. The motor may be affixed to the base and sensor body such that the motor may be able to rotate the sensor body with respect to the base. The stator may also be affixed to a motor housing, which may be affixed to the base, while the shaft may be affixed to the sensor body (however, in some cases, the sensor body may alternatively be affixed to the rotor instead of being directly affixed to the shaft).

Figure 2:
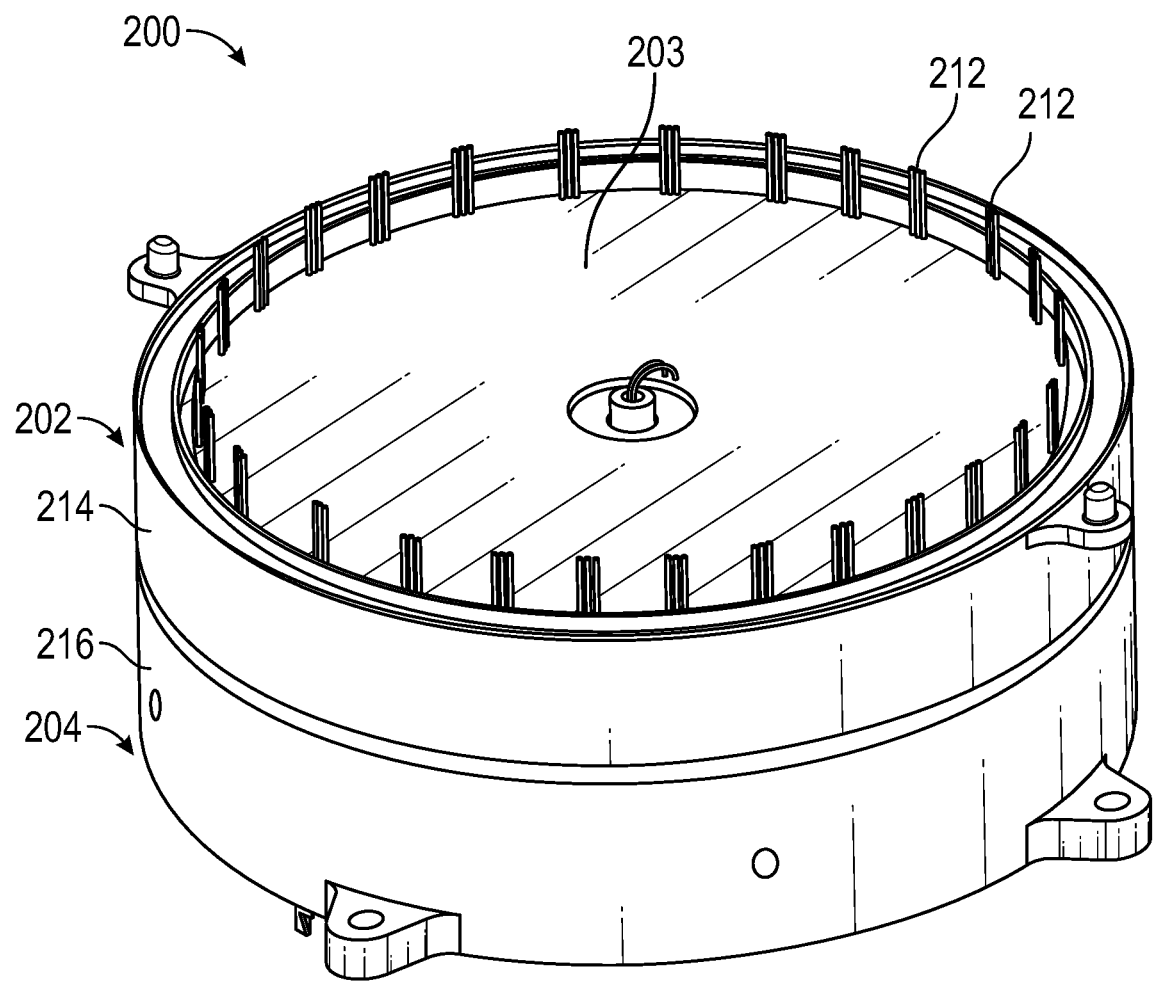
FIG. 2 depicts an orthogonal view of a LIDAR assembly, in accordance with one or more example embodiments of the disclosure.

FIG. 2 depicts an orthogonal view of a LIDAR assembly 200. The LIDAR assembly 200 may be the same as LIDAR assembly 110 described with respect to FIG. 1, as well as any other LIDAR assembly described herein. In some embodiments, the LIDAR assembly 200 may include at least a first portion 204 and a second portion 202. The first portion 204 may include a first housing 216 and the second portion 202 may include a second housing 214. The first housing 216 and second housing 214 may provide protection for any elements included within the first portion 204 and/or the second portion 202, such as protection from weather conditions, contaminants in the environment, etc. The first portion 204 may be a stator of the LIDAR assembly 200. That is, the first portion 204 may be a portion of the LIDAR assembly 200 that may remain fixed relative to other portions of the LIDAR assembly 200. Likewise, the second portion 202 may be a rotor of the LIDAR assembly 200. That is, the second portion 202 may be a portion of the LIDAR assembly 200 that may rotate relative to other portions of the LIDAR assembly 200, such as the first portion 204 (for example, the stator).

In some embodiments, the second portion 202 as including one or more printed circuit boards (for example, printed circuit board 203, as well as any other printed circuit boards not depicted in the figure). The printed circuit board 203 may represent the sensor body (or a portion of the sensor body) of the LIDAR assembly as described above. That is, the sensor body of the LIDAR assembly may be affixed to the second portion 202 of the LIDAR assembly 200, and may rotate along with the second portion 202 relative to the first portion 204. Particularly, although not depicted in the figure, the printed circuit board 203 may include any number and/or type of electronic components used by the LIDAR assembly 200. For example, the printed circuit board 203 may include any of the emitting devices 102, one or more detector devices 103, and/or one or more computing systems 104 as described with respect to FIG. 1. The printed circuit board 203 may also include one or more sensors. In some embodiments, the one or more sensors may include one or more magnetic field sensors 212 that may be used to measure the magnetic fields produced by various magnets (not depicted in the figure) affixed to the first portion 204 of the LIDAR assembly 200. For example, the one or more magnetic field sensors may be Hall sensors. The one or more magnetic field sensors 212 may be arranged in a circular fashion around the circumference of the printed circuit board 203. The one or more sensors may be arranged above the one or more magnets such that the one or more sensors may be able to effectively measure the magnetic fields of the magnets. Any of the elements described as being included in the example printed circuit board 203 illustrated in the figure may be included in any number of other printed circuit boards not depicted in the figure. The one or more sensors may also include any other types of sensors, such as one or more temperature sensors. Additional details regarding the specific elements included in the first portion 204 and/or the second portion 202 of the LIDAR assembly 200 may be described in additional detail below.

Figure 3:
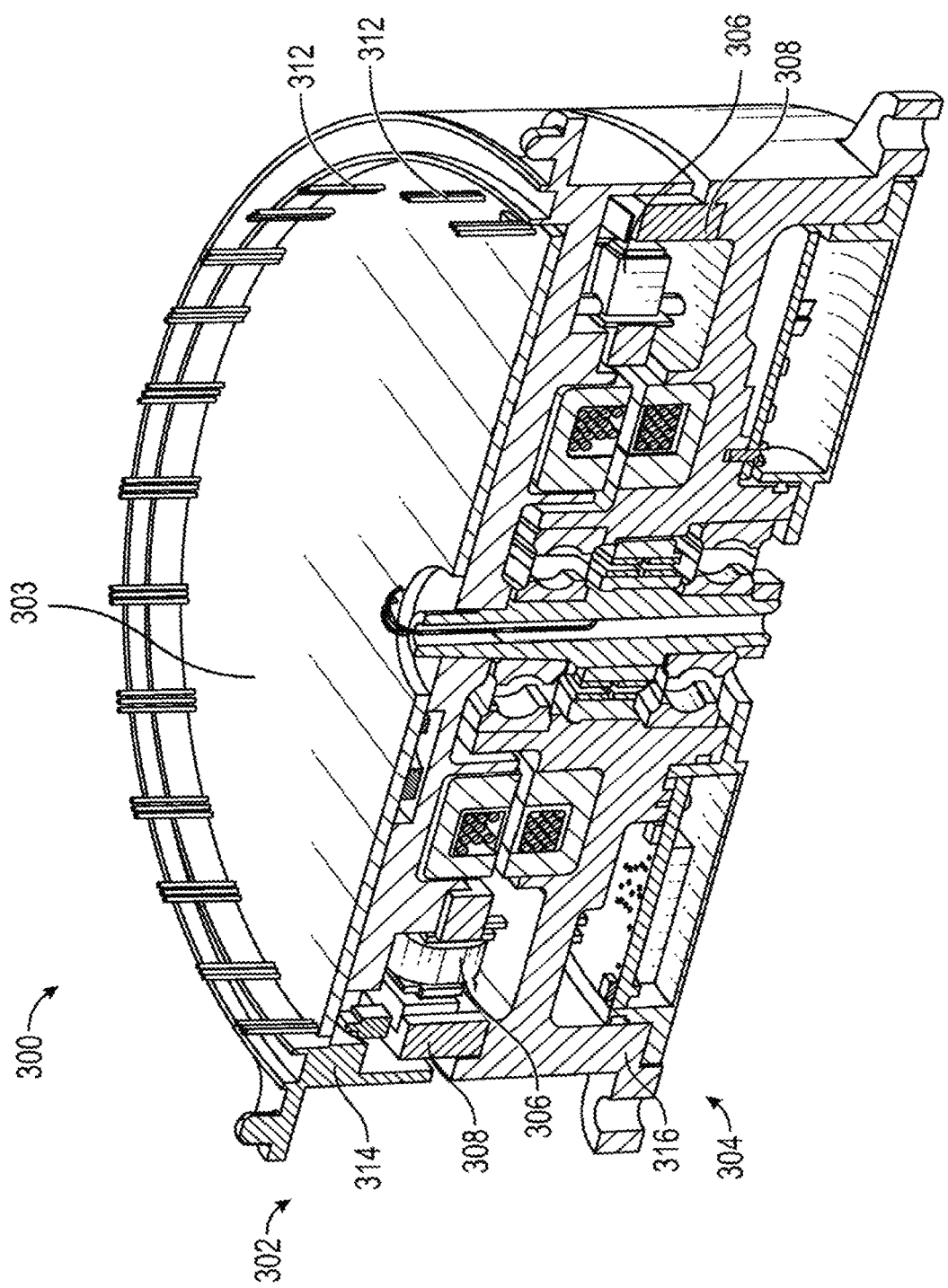
FIG. 3 depicts a cross-section view of a LIDAR assembly, in accordance with one or more example embodiments of the disclosure.

FIG. 3 depicts a cross-section view of a LIDAR assembly 300. The LIDAR assembly 300 may be the same as LIDAR assembly 200. That is, FIG. 3 may depict the same (or a similar) LIDAR assembly 300 as the LIDAR assembly 200 depicted in FIG. 2, but may present a cross-section view to provide an illustration of elements that may be included within the LIDAR assembly 300. For example, LIDAR assembly 300 may include a first portion 304 and a second portion 302. The first portion 304 may include a first housing 316, and the second portion 302 may include a second housing 314. The LIDAR assembly 300 may also include a printed circuit board 303. As with the printed circuit board 203 depicted in FIG. 2, the printed circuit board 303 may not depict any electronic components, but include any electronic components associated with the LIDAR system. The same may apply to any other printed circuit board depicted and/or described herein. As described above with respect to the LIDAR assembly 200, the first portion 304 may be a stator of the LIDAR assembly 300. That is, the first portion 304 may be a portion of the LIDAR assembly 300 that may remain fixed relative to other portions of the LIDAR assembly 300. Likewise, the second portion 302 may be a rotor of the LIDAR assembly 300. That is, the second portion 302 may be a portion of the LIDAR assembly 300 that may rotate relative to other portions of the LIDAR assembly 300, such as the first portion 304 (for example, the stator).

Through the cross-section view it may be illustrated that the first portion 304 of the LIDAR assembly 300 may further include one or more magnets 308. The one or more magnets 308 may be provided on the first portion 304 in a circular arrangement, and may be permanently or removeably affixed to the first portion 304. The one or more magnets 308 may be arranged around a circumference of the first portion 304 such that elements of the second portion 302, such as the windings 306, may be provided adjacent to the one or more magnets 308, but located closer to a center point of the LIDAR assembly 300. The one or more magnets 308 may also be arranged such that they may be positioned in line with the one or more magnetic field sensors 312 included on the second portion 302 of the LIDAR assembly 300.

The cross-section view of the LIDAR assembly 300 may also illustrate that the second portion 302 may include one or more windings 306. In some embodiments, the one or more windings 306 may be arranged more internally than the one or more magnets 308 provided on the first portion 304 of the LIDAR assembly 300. The one or more windings 306 may be used to interact with the one or more magnets 308 to produce a rotation of the second portion 302 of the LIDAR assembly 300 relative to the first portion 304 of the LIDAR assembly 300. That is, the LIDAR assembly 300 may operate by providing a current to the one or more windings 306 on the second portion 302 of the LIDAR assembly 300. The current may cause the one or more windings 306 to produce a corresponding magnetic field, which may interact with the magnetic fields produced by the one or more magnets 308. This interaction may cause a rotation of the second portion 302 of the LIDAR assembly 300 relative to the first portion 304. However, this is merely one example of a mechanism by which the rotation of the second portion 302 of the LIDAR assembly 300 may be produced.

Figure 4:
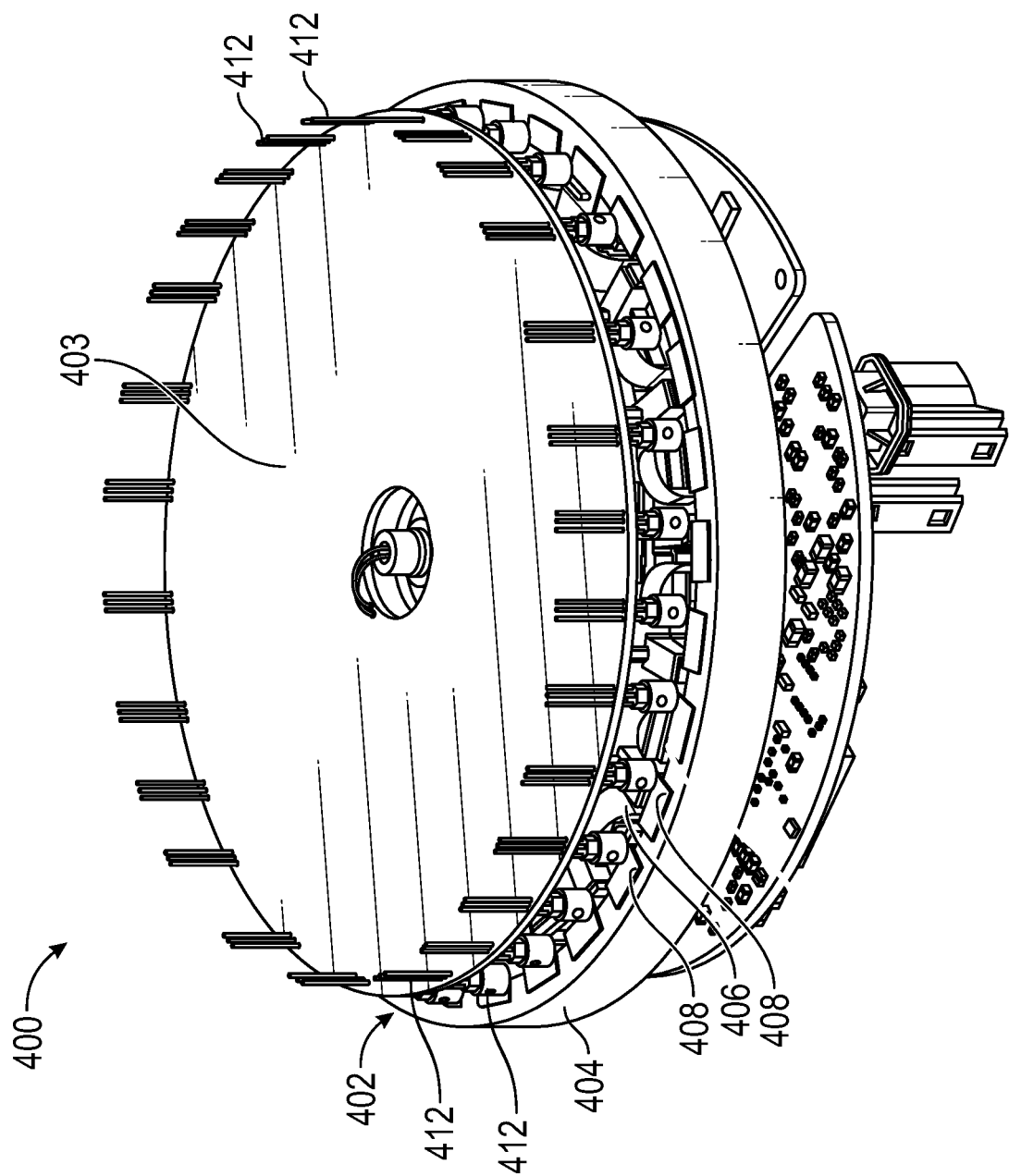
FIG. 4 depicts an orthogonal view of a LIDAR assembly, in accordance with one or more example embodiments of the disclosure.

FIG. 4 depicts an orthogonal view of a LIDAR assembly 400. The LIDAR assembly 400 may be the same as the LIDAR assembly 300 depicted in FIG. 3, the LIDAR assembly 200 depicted in FIG. 2, or any other LIDAR assembly described herein. For example, the LIDAR assembly 400 may include a first portion 404, a second portion, one or more printed circuit boards (for example printed circuit board 403), one or more magnets 408, one or more windings 406, and/or one or more sensors (such as one or more magnetic sensors 412). The orthogonal view provided in FIG. 4, however, may provide a view of the LIDAR assembly 400 without the housings (for example, housing 314 and/or housing 316 depicted in FIG. 3, and/or any other housing). This may provide a more detailed view of the elements of the first portion 404 and the second portion 402 of the LIDAR assembly 400. For example, the orthogonal view may provide a more detailed illustration of the one or more windings 406 included in the second portion 402 of the LIDAR assembly 400, as well as the one or more magnets 408 included in the first portion 404 of the LIDAR assembly. The orthogonal view presented in the figure may also better illustrate the positioning of the one or more magnetic field sensors 412 relative to the one or more magnets 408. For example, it may be illustrated that the one or more magnetic field sensors 412 extend through the printed circuit board 403 to be closer in proximity to the one or more magnets 408.

Figure 5:
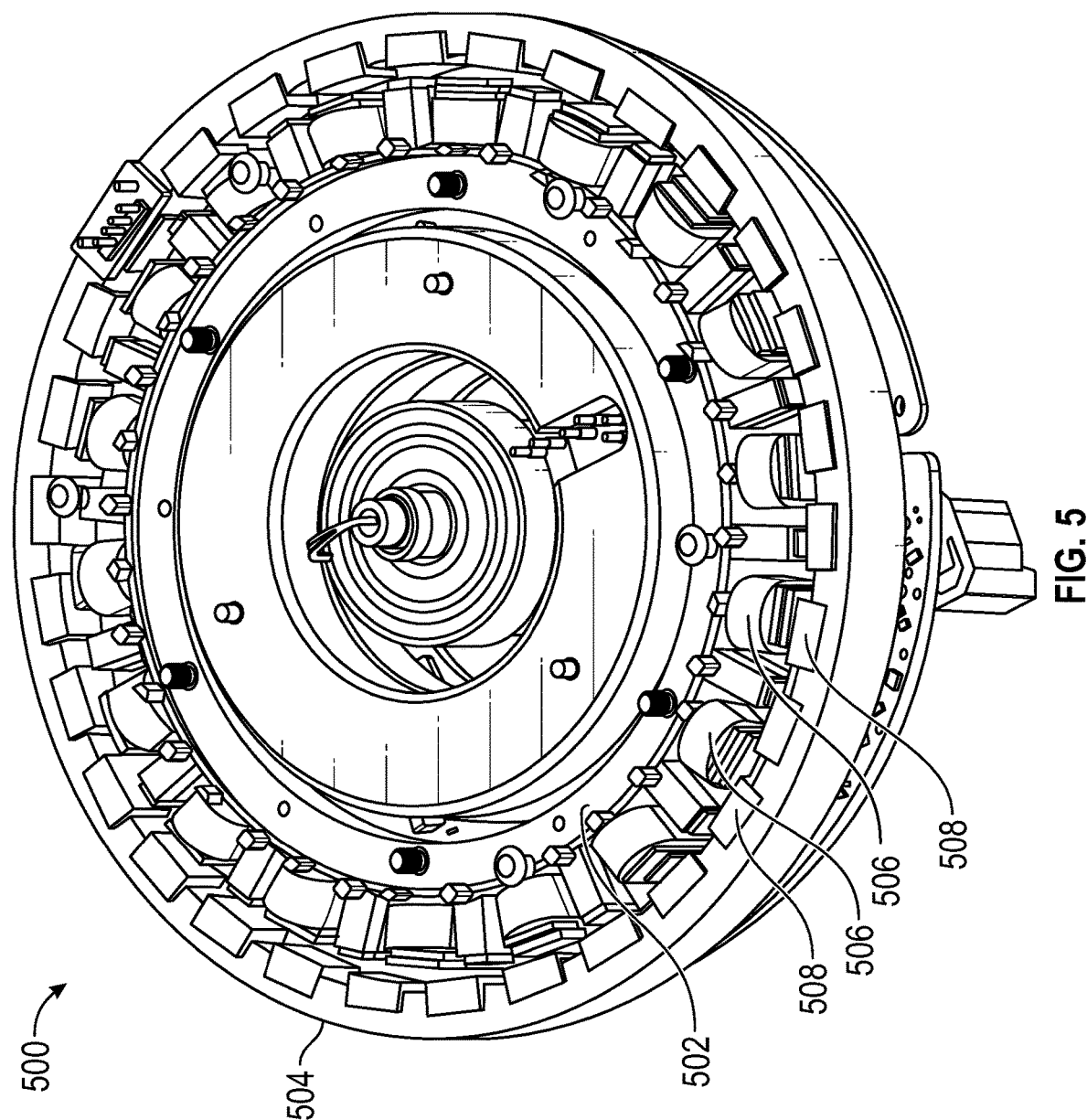
FIG. 5 depicts an orthogonal view of a LIDAR assembly, in accordance with one or more example embodiments of the disclosure.

FIG. 5 an orthogonal view of a LIDAR assembly 500. The LIDAR assembly 500 may be the same as the LIDAR assembly 400 depicted in FIG. 4, or any other LIDAR assembly described herein. For example, the LIDAR assembly 500 may include a first portion 504, a second portion 502, one or more magnets 508, one or more windings 506, and/or one or more sensors (such as one or more magnetic sensors 512). The orthogonal view provided in FIG. 5, however, may provide a view of the LIDAR assembly 500 without the housings (for example, housing 314 and/or housing 316 depicted in FIG. 3) and without the printed circuit board 412, which may provide an even more detailed view of the elements of the first portion 504 and the second portion 502 of the LIDAR assembly 500.

Figure 6:
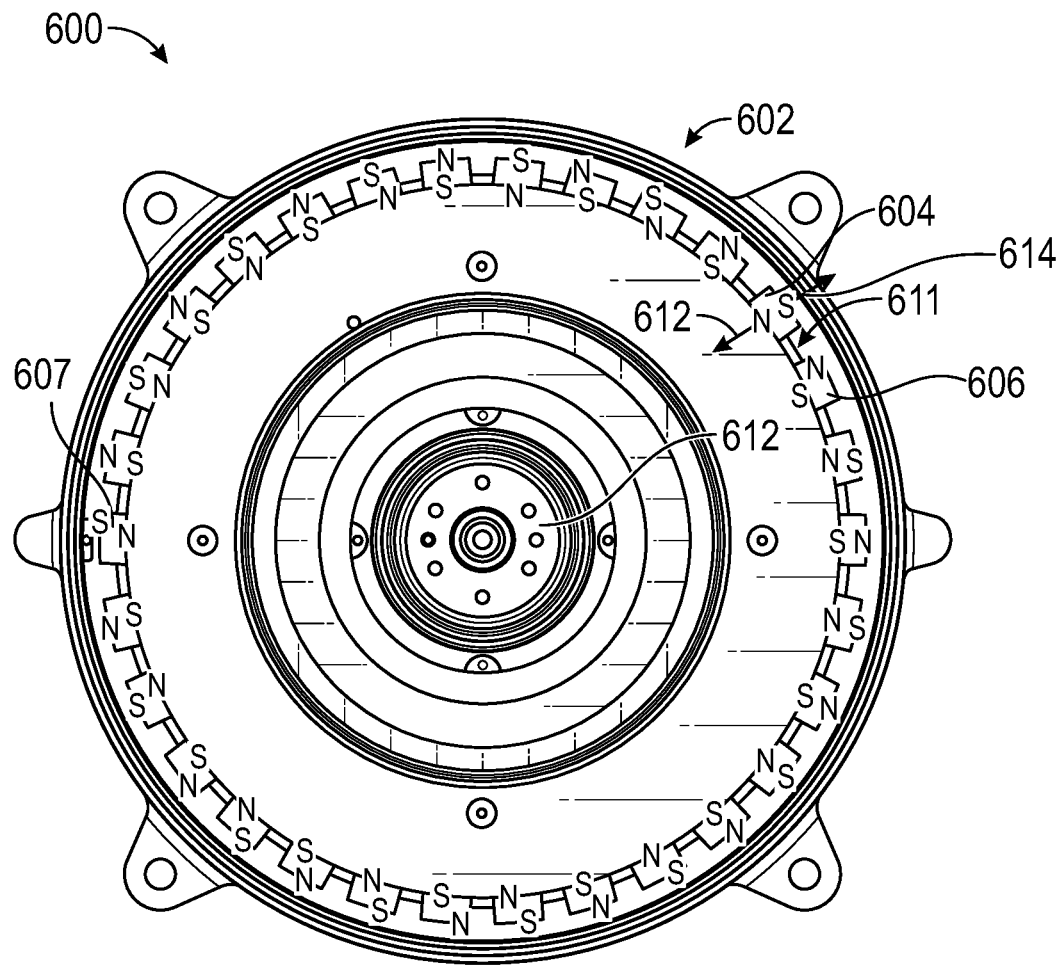
FIG. 6 depicts an example top-down view of a first portion of a LIDAR assembly, in accordance with one or more example embodiments of the disclosure.

FIG. 6 depicts an example top-down view of a first portion 600 of a LIDAR assembly (for example, the LIDAR assembly depicted in FIGS. 2-5, as well as any other figures). In some embodiments, the first portion 600 of the LIDAR assembly may be a fixed portion of the LIDAR assembly (for example, the stator of the LIDAR assembly as described above). That is, the first portion 600 may remain fixed while a second portion (which may be depicted in FIGS. 5-6) of the LIDAR assembly rotates relative to the first portion 600. The first portion 600 of the LIDAR assembly may include at least one or more magnets (for example, a first magnet 604, a second magnet 606, and/or any other number of magnets). It should be noted that the configuration depicted in FIG. 6 may merely be exemplary, and the first portion 600 may also be a rotating portion instead of a fixed portion as well. For example, the magnets may also be placed on the rotating portion of the LIDAR assembly as well.

In some embodiments, the one or more magnets may be arranged on the first portion 600 of the LIDAR assembly at known locations and at known spacing intervals (for example, the first magnet 604 and the second magnet 606 may be separating by spacing 611) with respect to one another. For example, the magnets may be arranged around a circumference 610 of the first portion 600. The circle formed by the arrangement of the magnets may be of any varying diameter. Additionally, the magnets may also be arranged in any other physical arrangement as well besides a circular arrangement as well. In some embodiments, the one or more magnets may be arranged with a first group of magnets having a magnetic north pole facing in a first direction 612 and a second group of magnets having a magnetic south pole facing in the first direction 612. Likewise, the magnetic south pole of the first group of magnets may face a second direction 614 and the magnetic north pole of the second group of magnets may face the second direction 614. For example, if the first portion 600 of the LIDAR assembly is in the shape of a disc as depicted in the figure, then the first direction 612 may be facing radially towards the center of the disc and the second direction 614 may be facing radially away from the center of the disc. Magnets in the first group of magnets and magnets in the second group of magnets may be arranged such that every other magnet is in the first group of magnets. That is, the magnets may be arranged in an alternating fashion with every other magnet having a magnetic north pole facing in the first direction 612. For example, a first magnet 604 may have a magnetic north pole facing in the first direction 612, and a second magnet 606 adjacent to the first magnet 604 may have a magnetic south pole facing in the first direction 612. This may be illustrated by the "N" and "S" included on the first magnet 604 and the second magnet 606. This arrangement of magnets with alternating magnetic pole directions may influence the magnetic fields produced by the magnets, such that a sensor measuring the magnetic fields of successive magnets in the arrangement may produce a magnetic field plot in the shape of a sine wave. This may be advantageous for a signal processing purposes as may be described in further detail below. However, the arrangement of the magnets may not necessarily be limited to every other magnet having a magnetic north pole facing in the first direction. For example, in some embodiments, the magnets may alternate in pairs or groups, such that more than one adjacent magnet has a magnetic north pole facing the first direction before a magnet with a magnet including a magnetic south pole facing the first direction is provided in the arrangement.

In some embodiments, the one or more magnets may be arranged in equal intervals such that the physical spacing (for example, spacing 611 in between the first magnet 604 and the second magnet 606) between individual magnets on the first portion of the LIDAR assembly may be equivalent. Arranging the magnets in this manner may be advantageous because it may simplify signal processing of magnetic field data produced with respect to the magnets as the spacing intervals may be a fixed constant. However, in some cases, the physical spacing between individual magnets may not necessarily be equivalent. This may be a result of intentional unequal spacing, or may be the product of intrinsic irregularities that may naturally exist in such an arrangement.

In some embodiments, intentional unequal spacing may be provided between some or all of the magnets for a number of reasons. For example, a particular section of magnets may be physically spaced apart by a different distance than the remainder of the magnets in the LIDAR assembly in order to create a unique sector in the magnets. This unique sector may correspondingly produce a unique sector in the magnetic field waveforms measured by the sensors as they pass over the unique sector in the magnets. The unique sector may then be used to identify when the LIDAR assembly has made a complete rotation. That is, every time the unique magnet sector is identified through the unique sector of the magnetic field waveforms, it may be determined that a full rotation has been made. The use of this unique magnet sector to identify a full rotation of the LIDAR assembly may be an alternative to using the index magnet to identify when a full rotation has completed, as is described herein. In some cases, the unique magnet sector may be used in conjunction with the index magnet. For example, it may be desired to more easily be able to identify when the rotation of the LIDAR assembly has reached any amount of rotation before a full rotation has been made. In some cases, any number of unique sectors may be established by providing intentional unequal spacing in some of the magnets. In addition to intentional unequal spacing between some or all of the magnets, unintentional unequal spacing may occur because it may be difficult to provide an exactly equal spacing interval between all of the individual magnets (for example, due to manufacturing inconsistencies). For example, it may be difficult to provide an exactly equal spacing interval between all of the individual magnets, or the spacing may change over time (for example, due to natural wear of the LIDAR assembly). Even if the spacing irregularities are minuscule, this may be problematic because data accuracy in contexts such as autonomous vehicle navigation may be critical. Thus, in cases where the spacing between magnets is not a constant value it may be advantageous for information about individual spacing intervals between some or all of the magnets to be stored. For example, a look-up table including some or all of the spacing intervals between individual magnets in a LIDAR assembly may be stored. The look-up table may be stored locally to the system associated with the LIDAR assembly (for example, in a LIDAR system), or may also be stored remotely from the system (for example, at a remote server). The look-up table may also be updated at particular intervals to mitigate the impact of potential changes in the spacing of the magnets. In this manner, the exact spacing between specific magnets included in the LIDAR assembly may be obtained, which may improve signal processing accuracy associated with magnetic field data ascertained from the magnets.

Figure 7:
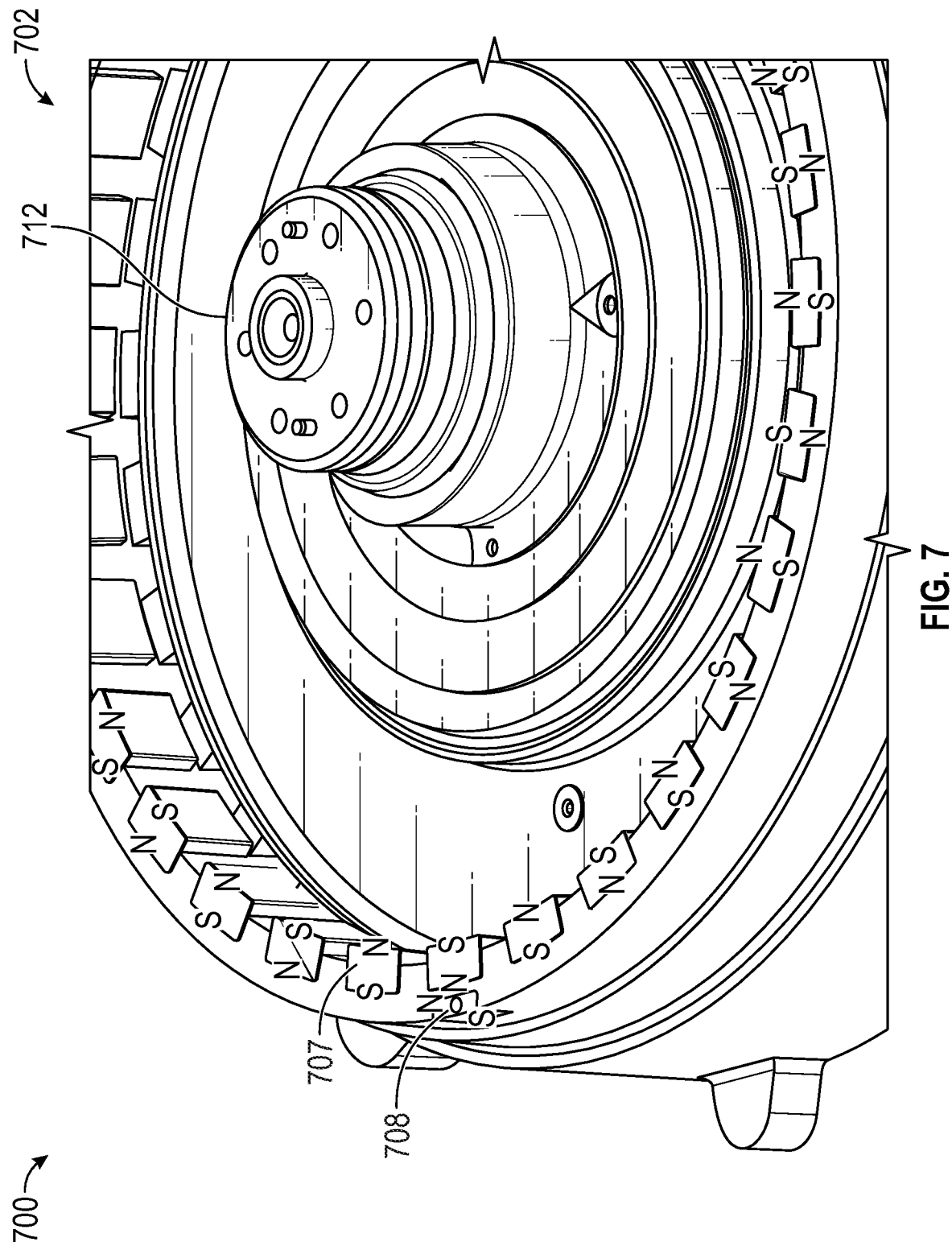
FIG. 7 depicts an example orthogonal view of the first portion of the LIDAR assembly, in accordance with one or more example embodiments of the disclosure.

In some embodiments, the first portion of the LIDAR assembly may also include one magnet (for example, magnet 608) that may be unique from the other magnets included in the arrangement. This magnet may be referred to herein as an "index magnet," and may be used as a reference point to identify every time the first portion of the LIDAR assembly has made a complete 360 degree revolution. That is, every time a magnetic field of the index magnet is registered, it may be determined that the full rotation of the LIDAR assembly has been achieved. To allow the index magnet to be distinguished from the other magnets included in the arrangement in terms of its magnetic field data, the index magnet may be provided further outwards on the first portion of the LIDAR assembly than the other magnets (or otherwise spatially separated from the other magnets). Additionally, the index magnet may be rotated orthogonally relative to the other magnets. For example, if the north and south poles of the magnets are facing a lateral direction, the north and south poles of the index magnet may be vertically-facing (FIG. 7 provides a close up example of the orientation of the index magnet). This may cause the magnetic field of the index magnet to be directed in a different direction than the magnetic fields of the other magnets included in the arrangement. It should be noted that any of the details pertaining to the arrangement of any of the magnets described above is not intended to be limiting, and any other configuration may also be applicable as well.

FIG. 7 depicts an example orthogonal view of the first portion 700 of the LIDAR assembly. The orthogonal view 700 may provide another perspective of the first portion 700 of the LIDAR assembly. This orthogonal view 700 may provide a visual example of the orientation of the index magnet 708 with respect to the other magnets included in the first portion 700 of the LIDAR assembly. For example, as may be described in more detail with respect to FIG. 5, the index magnet 708 may be provided further outwards on the first portion 700 of the LIDAR assembly than the other magnets (or otherwise spatially separated from the other magnets). Additionally, the index magnet 708 may be rotated orthogonally relative to the other magnets (for example, orthogonally rotated relative to magnet 707 or any other magnet included in the first portion 700). The orthogonal view 700 may also provide a different perspective of the shaft 712 that may rotate relative to the first portion 700, which may allow the second portion of the LIDAR assembly (not depicted in this figure, but depicted with respect to FIGS. 6-7) to rotate relative to the first portion 700.

FIG. 8 depicts an example orthogonal view of the first portion 800 of the LIDAR assembly. More specifically, FIG. 8 depicts a close up view of an index magnet 808 (which may be the same as index magnet 208 and/or index magnet 308, as well as any other index magnet described herein). As mentioned above, the index magnet 808 may be used as a reference point to identify every time the first portion 800 (which may be the same as first portion 202, first portion 302, or any other first portion described herein) of the LIDAR assembly has made a complete 360 degree revolution. That is, every time a magnetic field of the index magnet 808 is registered by any of the sensors described herein it may be determined that the full rotation of the LIDAR assembly has been achieved. To allow the index magnet 808 to be distinguished from the other magnets (for example, the magnet 807 and/or any other magnet included in the first portion 800 of the LIDAR assembly) included in the arrangement in terms of its magnetic field data, the index magnet 808 may be provided further outwards on the first portion 800 of the LIDAR assembly than the other magnets (or otherwise spatially separated from the other magnets). Additionally, the index magnet 808 may be rotated orthogonally relative to the other magnets. That is, if the north and south poles of the magnets are facing a lateral direction, the north and south poles of the index magnet may be vertically-facing. For example, FIG. 8 may depict the magnetic north pole 818 of the index magnet 808 and the magnetic south pole 820 of the index magnet 808 as being vertically oriented, whereas the other magnets (for example, the magnet 807 and/or any other magnet included in the first portion 800 of the LIDAR assembly) are horizontally oriented. This may cause the magnetic field of the index magnet 808 to be directed in a different direction than the magnetic fields of the other magnets included in the arrangement. It should be noted that any of the details pertaining to the arrangement of any of the magnets described above is not intended to be limiting, and any other configuration may also be applicable as well.

FIG. 9 an example bottom-up view 900 of a second portion 902 of the LIDAR assembly. That is, FIGS. 3-5 may depict a top side of the first portion of the LIDAR assembly, and FIG. 9 (as well as FIG. 7) may depict a bottom side of a second portion 902 of the LIDAR assembly. When the full LIDAR assembly is assembled (for example, as depicted in FIG. 2), the top side of the first portion may be facing the bottom side of the second portion 902, such that the one or more sensors may be facing the one or more magnets. In some embodiments, the second portion 902 of the LIDAR assembly may include at least one or more sensors (for example, a first sensor 904, a second sensor 906, a third sensor 980, a fourth sensor 910, a fifth sensor 914, a sixth sensor 916, a sixth sensor 918, a seventh sensor 920, and/or any other number of sensors).

In some embodiments, the one or more sensors may include Hall effect sensors, for example, which may be sensors that are capable of measuring the magnitude of a magnetic field. The one or more sensors may also include any other type of sensor that is capable of detecting a magnetic field as well. The one or more sensors may be used to measure the magnetic fields of the magnets included on the first portion (for example, first portion 202, first portion 302, first portion 402, and/or any other first portion described herein) of the LIDAR assembly. Given that the locations of the one or more sensors on the second portion 902 of the rotating platform may be fixed and the locations of the magnets on the first portion of the rotating platform may also be fixed, using the sensors to identify magnetic fields produced by specific magnets on the first portion may provide an indication of a current location of a sensor relative to a location on the first portion of the LIDAR assembly. That is, the one or more sensors may be arranged such that when the second portion 902 of the LIDAR assembly rotates relative to the first portion of the LIDAR assembly, the sensors positioned on the second portion 902 of the LIDAR assembly detect the magnetic fields produced by the magnets positioned on the first portion of the LIDAR assembly. As a more specific example, the first sensor 904 may rotate along with the rotation of the second portion 902. The first sensor 904 may pass by any of the magnets depicted in the first portion of the LIDAR assembly, and may consequentially produce magnetic field data every time the first sensor 904 passes by one of the magnets on the first portion. This data may then be used to determine the location of the first sensor 904 with respect to a reference point at any given time (the manner in which this determination is made may be described in additional detail below with respect to the signal processing aspect of the disclosure).

In some embodiments, one of the sensors (for example, sensor 918), which may referred to herein as the "index sensor," may be a sensor that may be used to detect the index magnet described above (for example, index magnet 208, index magnet 308, index magnet 408, or any other index magnet described herein). An orthogonal depicting of the second portion 902 including the index sensor may be depicted in FIG. 10 (for example, index sensor 1008). Similar to the other sensors, the index sensor may also be located on the second portion 902 of the LIDAR assembly. The index sensor may also be of the same or a similar type of sensor as the other sensors arranged on the second portion 902 of the LIDAR assembly. That is, the index sensor may be a Hall effect sensor or any other type of sensor capable of capturing magnetic field data. However, the index sensor may differ from the other sensors in that the index sensor may be positioned further away from the center of the second portion of the rotating platform than the other sensors arranged on the second portion of the LIDAR assembly (however, in some embodiments, the index sensor may also be positioned anywhere else on the second portion of the LIDAR assembly. Additionally, the index sensor may be oriented at a 90 degree offset from the orientation of the other sensors. That is, the index sensor may be orthogonally positioned relative to the other sensors to account for the rotational difference between the index magnet and the other magnets on the first portion of the LIDAR assembly. This may allow for the data produced by the index sensor to be distinguishable from the data produced by the other sensors, which may allow for the system to separately identify every instance in which the index magnet is passed by the index sensor. In this manner, the index sensor and index magnet may be used to identify when the LIDAR assembly has undergone a full 360 degree rotation. That is, if the index sensor is in a fixed position on the second portion of the LIDAR assembly and the index magnet is in a fixed position on the first portion of the LIDAR assembly, then every instance of the index sensor detecting the magnetic field of the index magnet may be indicative of a full rotation of the LIDAR assembly.

In some embodiments, the magnetic field data produced by the sensors may be analyzed by signal processing element(s) (for example, the one or more computing element 104 described with respect to FIG. 1) within the LIDAR system to track one or more operational parameters associated with the operation of the LIDAR assembly. These signal processing elements and the analysis they perform may be described in more detail with respect to FIGS. 1 and 8-9, for example. For example, the magnetic field data may be used to track a reference location on the second portion of the LIDAR assembly relative to the first portion of the LIDAR assembly at any given time. As a second example, the data may be used to determine a speed at which the LIDAR assembly is rotating. The data may also be used to track any number of other types of operational parameters associated with the LIDAR assembly as well.

By the nature of the particular arrangement of the magnets and the sensors as described above, the output of the sensors may be in the form of a sine wave. This may be because the arrangement of the magnets in alternate north/south pole directions may cause a sensors to measure positive and negative magnetic fields at every other magnet that the sensor passes. Thus, the magnetic field data produced by the sensors may alternate between positive and negative values, which may result in a sine wave output. For example, depending on the configuration of the sensors, when a sensor passed by a magnet with a north pole facing in one direction, the sensor may produce a positive magnitude magnetic field value. Likewise, when the sensor passes by a magnet with a south pole facing in the one direction, the sensor may produce a negative magnitude magnetic field value. This explanation is only intended to be exemplary, however, and the magnets with a north pole facing in the one direction may produce negative magnitude data (and/or the magnets with a south pole facing in the one direction may produce positive magnitude data). Additionally, this configuration of alternating north/south pole direction magnets may also merely be exemplary, and the form that the output data from the sensors takes may depend on the particular arrangement of the magnets and the sensors that is actually implemented.

Figure 11:
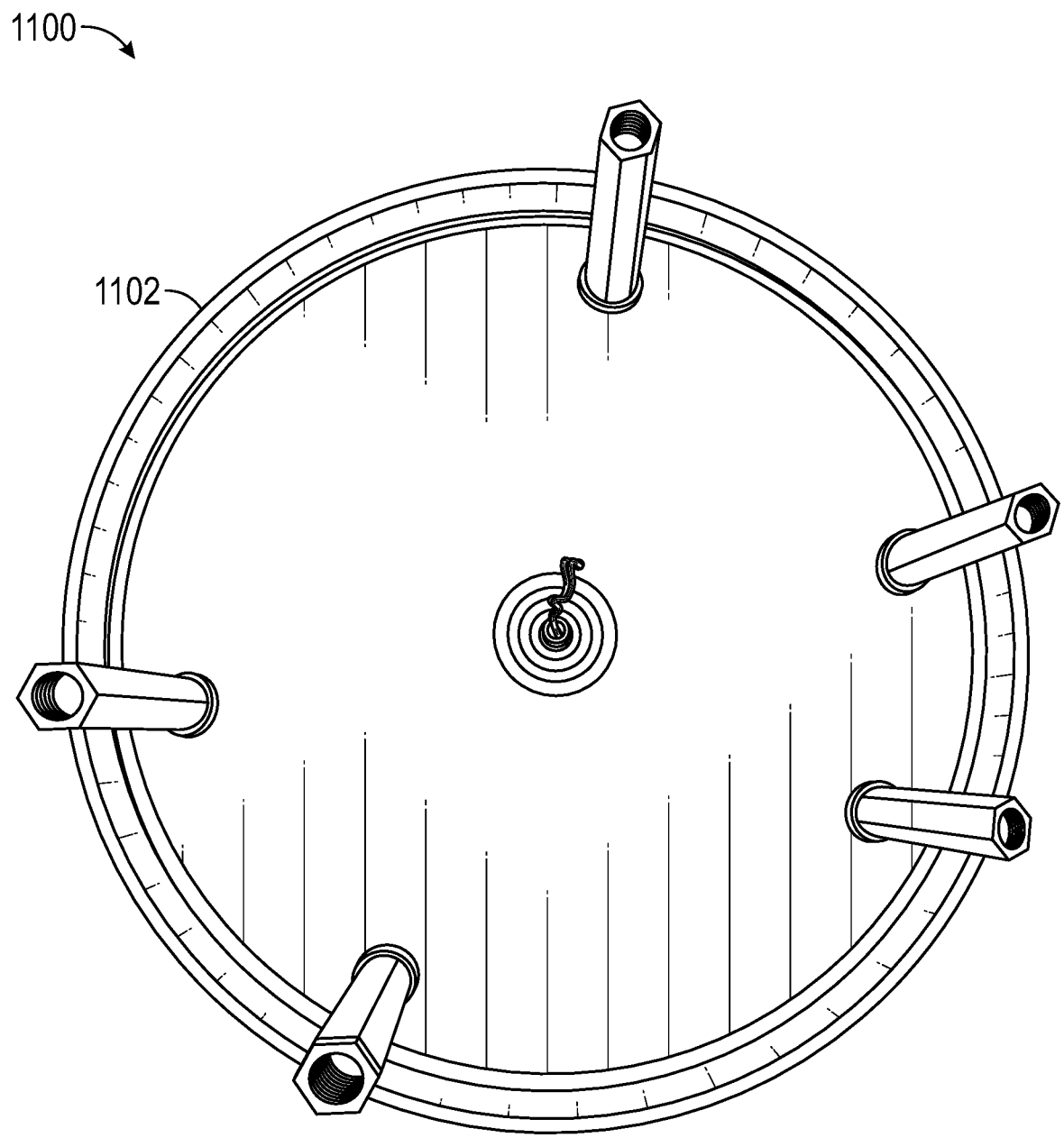
FIG. 11 depicts a top-down view of a second portion of a LIDAR assembly, in accordance with one or more example embodiments of the disclosure.

FIG. 11 depicts a top-down view of a second portion 1100 of a LIDAR assembly. That is, the top-down view of the second portion 1100 may depict the other side of the second portion 902 depicted in FIG. 9. As depicted in the figure, and as described above with respect to at least FIG. 2, the top side of the second portion 1100 may include one or more printed circuit boards (for example, printed circuit board 1103).

Figure 12:
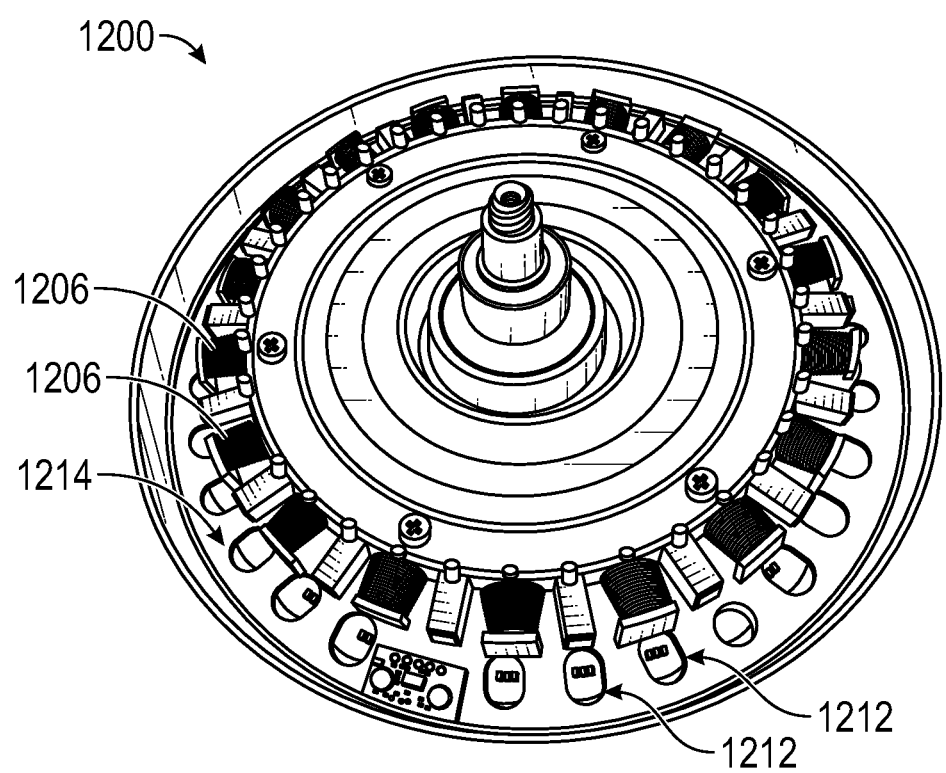
FIG. 12 depicts a bottom-up view of a first portion of a LIDAR assembly, in accordance with one or more example embodiments of the disclosure.

FIG. 12 depicts a bottom-up view of a first portion 1200 of a LIDAR assembly. That is, the bottom-up view may be similar to the bottom-up view depicted in FIG. 9. The bottom-up view may differ from the bottom-up view in FIG. 9 in that the bottom-up view may illustrate an area 1214 in which the magnets from the first portion of the LIDAR assembly may be provided. The bottom-up view may also depict the second portion 1200 as including one or more holes 1212. The one or more holes 1212 may allow for the one or more sensors provided on the top side of the second portion 1200 to extend through the second portion 1200 to be closer in proximity to the one or more magnets of the first portion that may be included in the area 1214 (for example, as depicted in FIG. 4).

Figure 13:
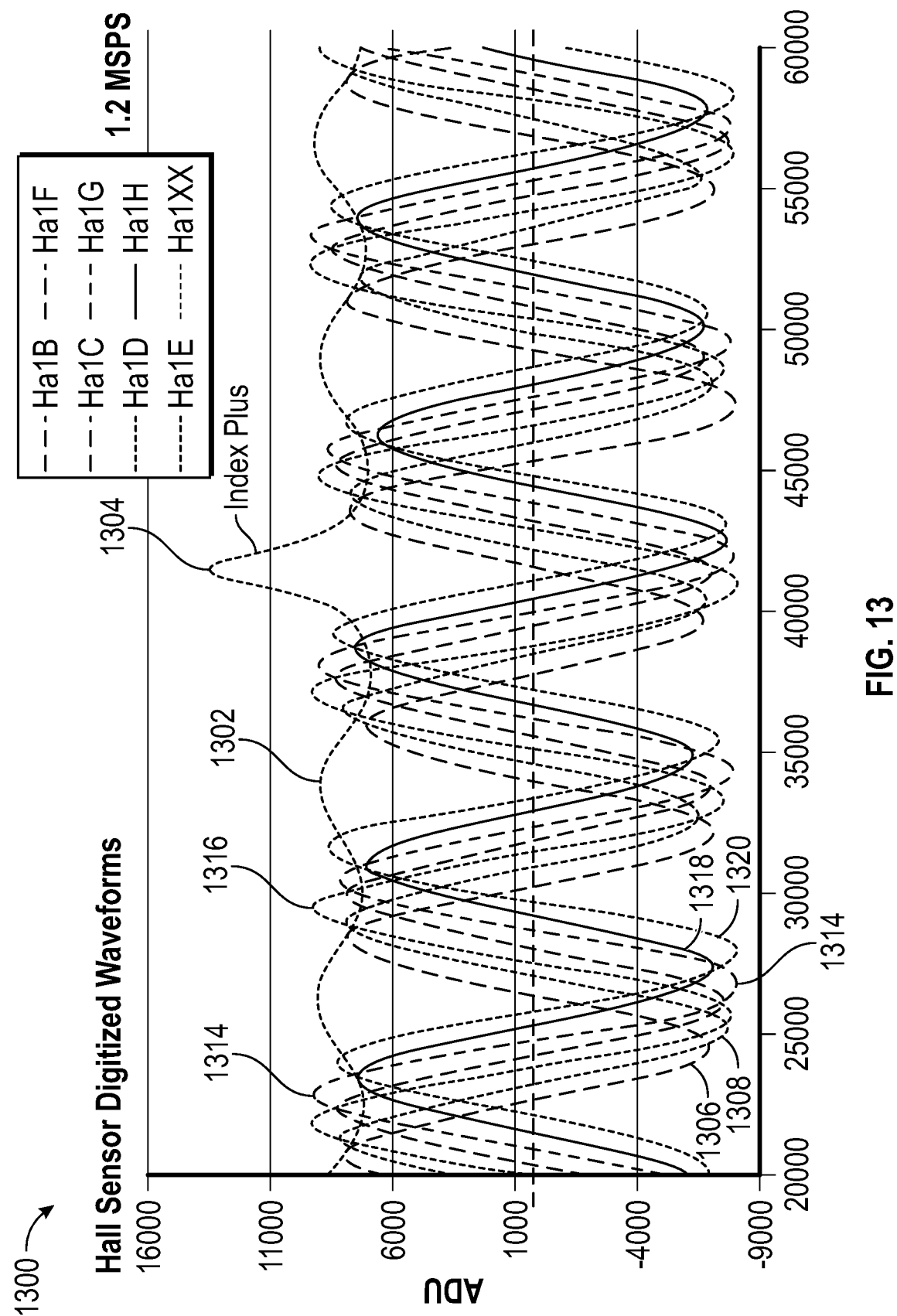
FIG. 13 depicts an example magnetic field data plot, in accordance with one or more example embodiments of the disclosure.

FIG. 13 depicts an example magnetic field data plot 1300. The example magnetic field data plot 1300 may be representative of magnetic field data produced by the one or more sensors (including the index sensor) on the second portion of the LIDAR assembly based on the magnetic fields produced by the one or more magnets (including the index magnet) on the first portion of the LIDAR assembly. The example magnetic field data plot 1300 may depict eight different waveforms (for example, waveform 1302, waveform 1306, waveform 1308, waveform 1310, waveform 1312, waveform 1314, waveform 1316, waveform 1318, and/or waveform 1320). In the particular example magnetic field data plot 1300 depicted in the figure, eight different waveforms may be depicted based on the configuration of seven sensors (for example, represented by waveform 1306, waveform 1308, waveform 1310, waveform 1312, waveform 1314, waveform 1316, waveform 1318) and an additional index sensor (for example, represented by waveform 1302) depicted in FIGS. 6-7 described above. However, any other number of waveforms may also be included based on the number of sensors that are implemented in any particular configuration of the second portion of the LIDAR assembly.

In some embodiments, the magnetic field data produced by the sensors may be analyzed by signal processing elements (these signal processing elements and the analysis they perform may be described in more detail with respect to FIGS. 1 and 8-9, for example) within the LIDAR system to track one or more operational parameters associated with the operation of the LIDAR assembly. For example, the magnetic field data may be used to track a reference location on the second portion of the LIDAR assembly relative to the first portion of the LIDAR assembly at any given time. As a second example, the data may be used to determine a speed at which the LIDAR assembly is rotating. The data may also be used to track any number of other types of operational parameters associated with the LIDAR assembly as well.

By the nature of the particular arrangement of the magnets and the sensors as described above, the output of the sensors may be in the form of sine waves. This may be because the arrangement of the magnets in alternate north/south pole directions may cause the sensors to measure positive and negative magnetic fields at every other magnet that the sensor passes. Thus, the magnetic field data produced by the sensors may alternate between positive and negative values, which may result in a sine wave output. For example, depending on the configuration of the sensors, when a sensor passed by a magnet with a north pole facing in one direction, the sensor may produce a positive magnitude magnetic field value. Likewise, when the sensor passes by a magnet with a south pole facing in the one direction, the sensor may produce a negative magnitude magnetic field value. This explanation is only intended to be exemplary, however, and the magnets with a north pole facing in the one direction may produce negative magnitude data (and/or the magnets with a south pole facing in the one direction may produce positive magnitude data). Additionally, this configuration of alternating north/south pole direction magnets may also merely be exemplary, and the form that the output data from the sensors takes may depend on the particular arrangement of the magnets and the sensors that is actually implemented.

Figure 14:
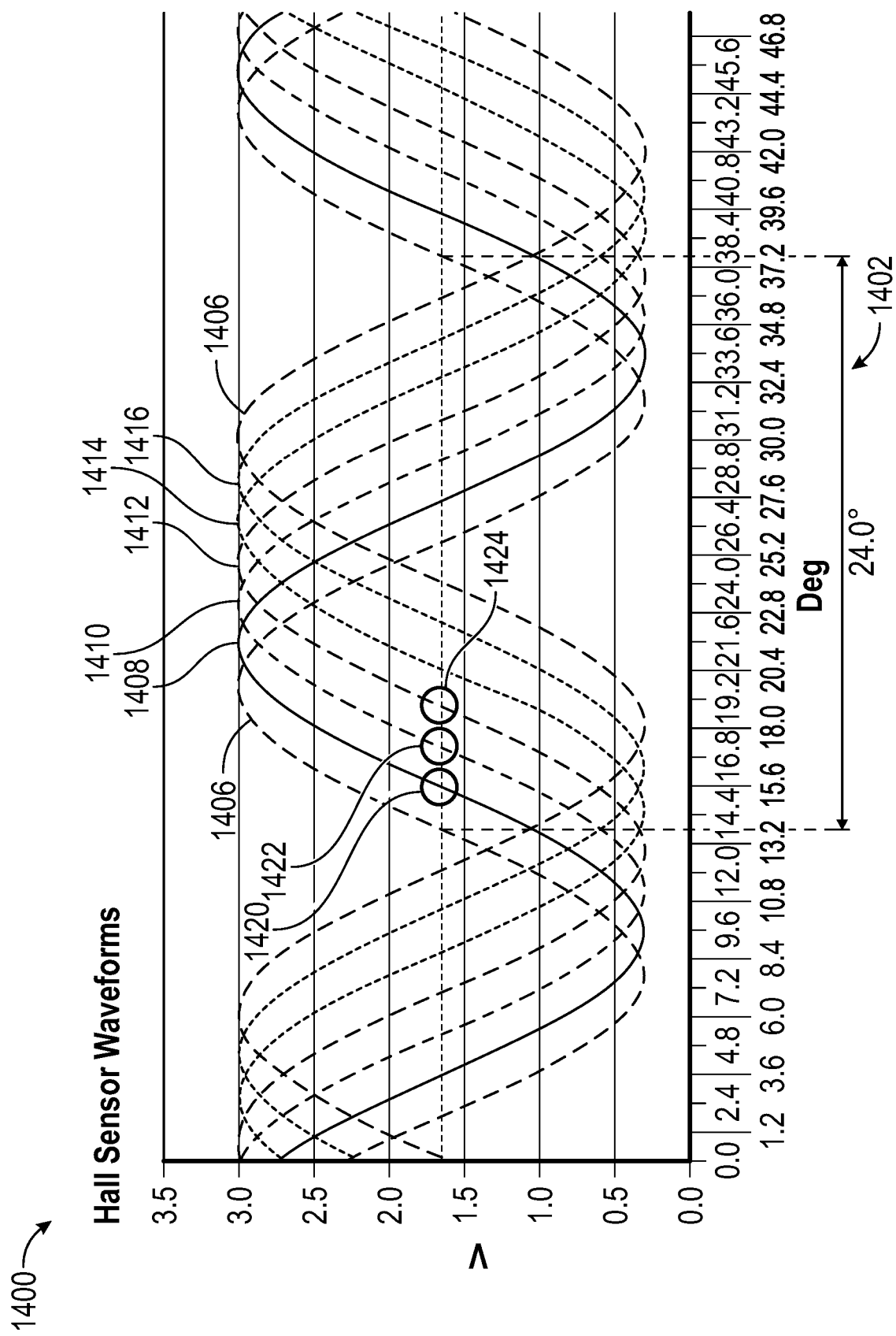
FIG. 14 depicts an example magnetic field data plot, in accordance with one or more example embodiments of the disclosure.

In some embodiments, the analysis performed by the signal processing elements may involve identifying zero-crossings in the magnetic field data. A zero-crossing may refer to a point at which a plot of the magnetic field data versus time crosses the x-axis of the plot. This may also be referred to as a "null point." The zero-crossing may represent a point at which a given sensor is located in between two different magnets of opposite polarities. The magnetic field data produced by the sensor shifts from either positive to negative or negative to positive magnetic field data as the sensor readings shift from a magnet of one polarity to a magnet of another polarity (for example, from a magnet with a magnetic north pole facing in one direction to a magnet with a magnetic south pole facing the one direction). Examples of zero-crossings may be illustrated in FIG. 14 as point 1420, point 1422, and/or point 1424. In this particular example, point 1420 may represent a first zero-crossing of waveform 1408, point 1422 may represent a first zero-crossing of waveform 1410, and point 1424 may represent a first zero-crossing of waveform 1412. However, the zero-crossings depicted in FIG. 14 are merely exemplary and intended to illustrate an example of a few zero-crossing locations. Any waveform associated with any of the sensors may produce any number of zero-crossings as magnetic field data shifts from positive to negative values and/or negative to positive values depending on the polarity of the particular magnet being measured by the sensors.

By identifying the location of the zero-crossings of the magnetic field data, it may be possible to determine when a sensor is located in a space between two alternating magnets. If information pertaining to the magnets and their arrangement on the first portion of the LIDAR assembly is known (for example, the number of magnets, their spacing relative to one another, etc.), then an amount of distance that the sensor has rotated relative to a starting position may be determined using the zero-crossing information. As one non-limiting example, if the second portion of the LIDAR assembly includes an arrangement of 30 total magnets, with half being oriented with their north poles facing in one direction, and half being oriented with their south poles facing in the one direction, then a full 360 rotation of the sensor may produce a total of 15 sine waves (that is 15 sine waves may be produced per revolution of the first portion of the LIDAR assembly. These numbers are merely exemplary, and the same determinations may be made regardless of the number of magnets. For example, if 40 magnets are used, then the sensor may produce a total of 20 sine waves per revolution instead of 15.

In some embodiments, multiple sensors may be arranged on the second portion of the LIDAR assembly. For example, the sensors may be arranged equally-spaced apart from one another around the circumference of the second portion of the LIDAR assembly. However, the sensors may also be arranged in any other manner, such as in non-equal spacing intervals or in locations other than the circumference of the first portion. Including multiple of these sensors may allow for multiple sine waves to be produced for a full rotation of one of the sensors. This may provide additional data resolution and may also allow for enhanced confidence in the magnetic field data being produced by any given sensor. For example, if one only sensor is used, then it may be difficult to ascertain whether the data being produced by the one sensor is accurate. However, by introducing multiple sensors, the data produced by each of the sensors may be compared to identify any faulty data being produced by any of the individual sensors. In some embodiments, the sensors may be equally-spaced apart in order to produce a phase relationship between the sine waves formed by the output magnetic field measurements of the individual sensors. That is, if the individual sensors are equally spaced apart physically, then the sine waves produced by the individual sensors may be equally time shifted along an x-axis of the plots. This, in turn, may provide an equal interval between each of the zero-crossings of the sine waves associated with the individual sensors.

In some embodiments, it may also be possible to process the output sine wave of the sensors using data points other than the zero crossings of the sine waves. For example, data points such as the amplitudes, slopes, minimum and maximum points, or any other arbitrary reference points along the plots may also be used. However, using the zero-crossing instead of these other potential data points may be advantageous because the strength of the magnets and the corresponding magnitude of the magnetic fields they produce may vary depending on various factors, such as the temperatures the magnets are exposed to. That is, the magnetic fields of the magnetics may weaken depending on the temperature. Consequentially, the amplitude value of one magnet at a first temperature may be different than the amplitude value of the same magnet at a different temperature. Thus, if data points such as amplitude were used, the signal processing may need to take these changes into account. Even if the signal processing were able to accurately take into account the effect of the temperature changes on the amplitude of the measured magnetic fields, this would also have the downside of increasing signal processing complexity required to make the same determinations with respect to location tracking. In contrast, using the zero-crossings of the data output plots may mitigate or eliminate these magnet-specific variations. For example, if a threshold were used to identify various amplitudes of the sine waves, then a temperature variation in one magnet may cause an amplitude to fall below the threshold and result in that particular magnet not being registered. However, regardless of any magnetic field variations based on temperature or otherwise, based on the alternating polarity configuration described herein (for example, one magnet with magnetic north facing one direction and an adjacent magnet with magnetic south facing that direction), the number of zero-crossings may remain constant because the magnetic field data may always transition from one polarity to another.

In some embodiments, if the number of sine waves per revolution of a given sensor on the second portion of the LIDAR assembly is known, and the starting point at which the rotation of the first portion begins is also known, then the position of the first sensor relative to a starting point of the first sensor relative to the first portion of the rotating platform may also be ascertained by determining the number of zero-crossings that have taken place since the last instance at which the sensor was located at its starting position. For example, if there are 40 magnets in the second portion, then it may be determined that the sensor has made approximately a half revolution once 10 zero crossings have been identified. The accuracy of these sensor location determinations may further be improved as well. A first accuracy improvement may be possible by using an equal (or known) spacing between each of the magnets. A second accuracy improvement may be possible by increasing the number of magnets included in the second portion of the LIDAR assembly. By increasing the number of magnets, the data resolution (for example, the number of data points per revolution) may be increased, which may provide more data about the potential location of the sensor relative to its starting position. An increase in the number of magnets may also result in a decrease in the amount of spacing between each of the magnets, so the distance the sensor may travel before receiving a data point may be reduced.

FIG. 15 is a flow of an example method 1500 of the present disclosure. In some embodiments, the method 1500 includes a step 1502 of receiving from a first sensor, as a first portion of a LIDAR assembly rotates relative to a second portion of the LIDAR assembly, a first magnetic field measurement associated with a first magnetic field of a first magnet. In some embodiments, the first magnet is located on the second portion and arranged with a north pole of the first magnet facing a first direction. In some embodiments, a second magnet is located on the second portion and arranged with a south pole of the second magnet facing the first direction. In some embodiments, the first sensor is located on the first portion. In some embodiments, the first sensor is further configured to measure the first magnetic field of the first magnet and a second magnetic field of the second magnet as the first portion rotates relative to the second portion. In some embodiments, the method 1500 includes a step 1504 of receiving a second magnetic field measurement associated with the magnetic field of the second magnet from the first sensor. In some embodiments, the method 1500 includes a step 1506 of calculating a position of the first sensor relative to the second portion based on the first magnetic field measurement and the second magnetic field measurement.

Figure 16:
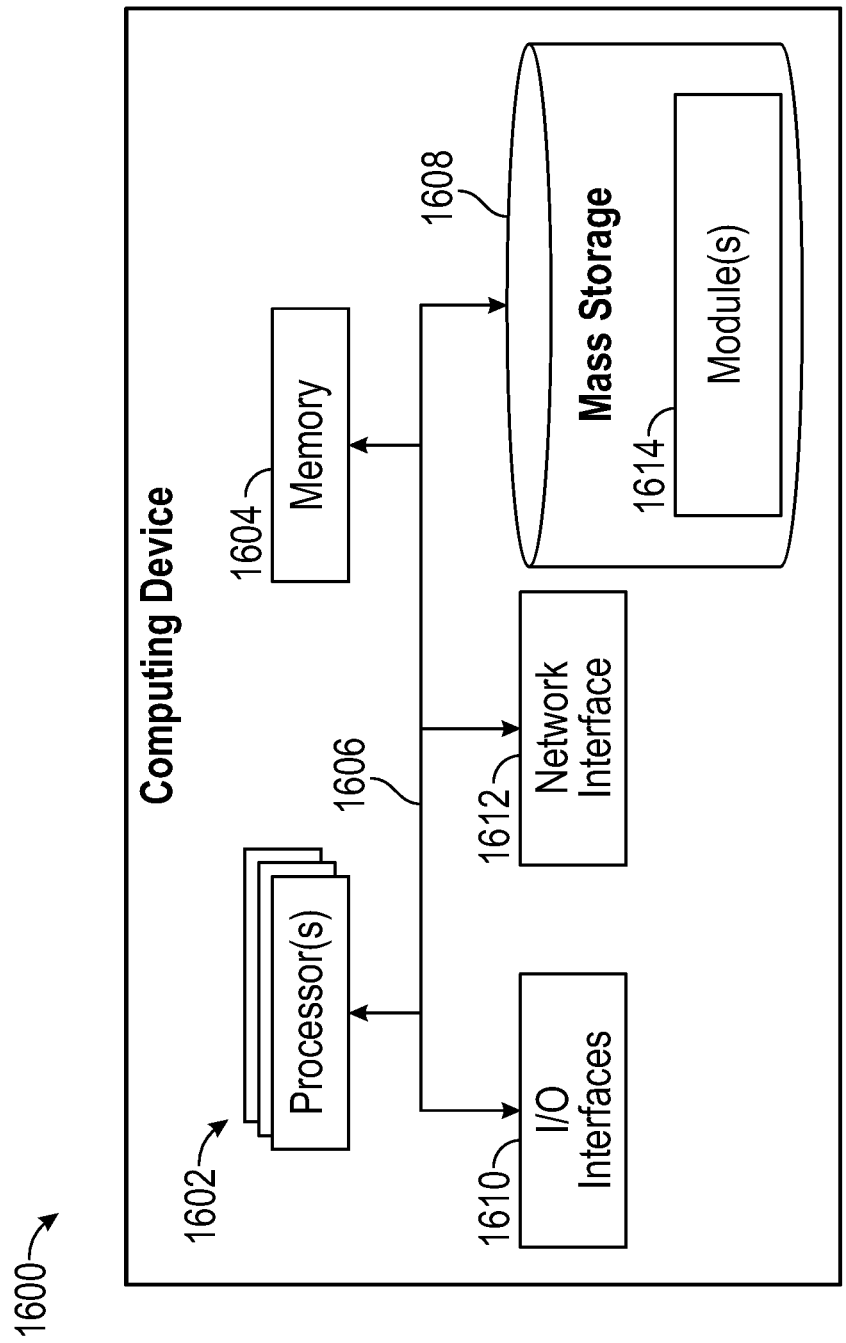
FIG. 16 depicts an example computing system, in accordance with one or more example embodiments of the disclosure.

FIG. 16 illustrates an example computing system 1600, in accordance with one or more embodiments of this disclosure. The computing 1600 device may be representative of any number of elements described herein, such the computing systems 104. The computing system 1600 may include at least one processor 1600 that executes instructions that are stored in one or more memory devices (referred to as memory 1604). The instructions can be, for instance, instructions for implementing functionality described as being carried out by one or more modules and systems disclosed above or instructions for implementing one or more of the methods disclosed above. The processor(s) 1600 can be embodied in, for example, a CPU, multiple CPUs, a GPU, multiple GPUs, a TPU, multiple TPUs, a multi-core processor, a combination thereof, and the like. In some embodiments, the processor(s) 1600 can be arranged in a single processing device. In other embodiments, the processor(s) 1600 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 1600 can access the memory 1604 by means of a communication architecture 1606 (e.g., a system bus). The communication architecture 1606 may be suitable for the particular arrangement (localized or distributed) and type of the processor(s) 1600. In some embodiments, the communication architecture 1606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 1604 also can retain data.

Each computing system 1600 also can include mass storage 1608 that is accessible by the processor(s) 1600 by means of the communication architecture 1606. The mass storage 1608 can include machine-accessible instructions (e.g., computer-readable instructions and/or computer-executable instructions). In some embodiments, the machine-accessible instructions may be encoded in the mass storage 1608 and can be arranged in components that can be built (e.g., linked and compiled) and retained in computer-executable form in the mass storage 1608 or in one or more other machine-accessible non-transitory storage media included in the computing system 1600. Such components can embody, or can constitute, one or many of the various modules disclosed herein. Such modules are illustrated as modules 1614. In some instances, the modules may also be included within the memory 1604 as well.

Figure 10:
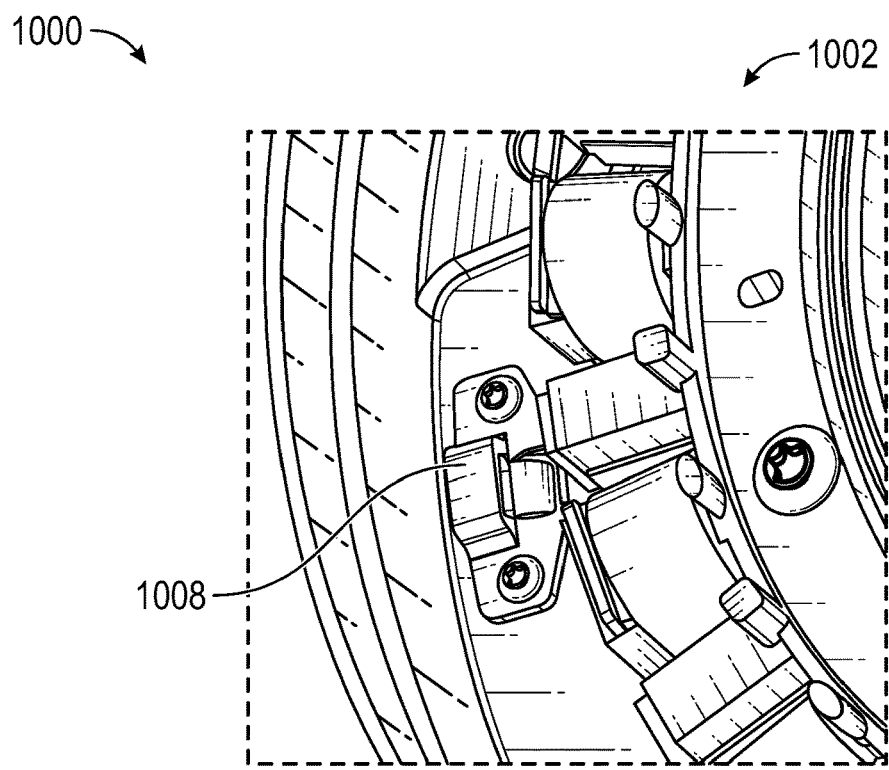
FIG. 10 depicts an example orthogonal view of a second portion of the LIDAR assembly, in accordance with one or more example embodiments of the disclosure.

Execution of the modules 1614, individually or in combination, by at least one of the processor(s) 1600, can cause the computing system 1600 to perform any of the operations described herein (for example, the operations described with respect to FIG. 10, as well as any other operations).

Each computing system 1600 also can include one or more input/output interface devices 1610 (referred to as I/O interface 1610) that can permit or otherwise facilitate external devices to communicate with the computing system 1600. For instance, the I/O interface 1610 may be used to receive and send data and/or instructions from and to an external computing device.

The computing system 1600 also includes one or more network interface devices 1612 (referred to as network interface(s) 1612) that can permit or otherwise facilitate functionally coupling the computing system 1600 with one or more external devices. Functionally coupling the computing system 1600 to an external device can include establishing a wireline connection or a wireless connection between the computing system 1600 and the external device. The network interface devices 1612 can include one or many antennas and a communication processing device that can permit wireless communication between the computing system 1600 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 800.11, IEEE 800.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

It should further be appreciated that the LiDAR system 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:

1. A LIDAR assembly comprising:
   a first portion and a second portion configured to rotate relative to one another;
   a first magnet located on the second portion and arranged with a north pole of the first magnet facing a first radial direction;
   a second magnet located on the second portion and arranged with a south pole of the second magnet facing the first radial direction;
   a first sensor located on the first portion, wherein the first sensor is further configured to measure a first magnetic field of the first magnet and a second magnetic field of the second magnet as the first portion and second portion rotate relative to one another;
   memory that stores computer-executable instructions; and
   a processor configured to access the memory, wherein the processor is configured to execute the computer-executable instructions to:
   receive from the first sensor, as the first portion and the second portion rotate relative to one another, a first magnetic field measurement based on proximity of the first magnetic field of the first magnet to the first sensor;
   receive, from the first sensor, a second magnetic field measurement based on proximity of the second magnetic field of the second magnet to the first sensor; and calculate a position of the first sensor relative to the second portion based on the first magnetic field measurement and the second magnetic field measurement;

a third magnet, located on the second portion of the LIDAR assembly, the third magnetic magnet having a north pole that is facing a second direction, and wherein the second direction is orthogonally magnetic to the first radial direction; and a second sensor, located on the second portion of the LIDAR assembly, the second sensor being configured to measure a magnetic field of the third magnet.

2. The LIDAR assembly of claim 1, wherein calculating a position of the first sensor relative to the second portion is further based on a zero-crossing data point in between the first magnetic field measurement and the second magnetic field measurement.

3. The LIDAR assembly of claim 1, wherein the processor is configured to execute the computer-executable instructions to: receive a third magnetic field measurement from the second sensor based on proximity of the third magnetic field of the third magnet to the second sensor; and compare the third magnetic field measurement of the second sensor to a threshold magnetic field value; and identify, based on the third magnetic field measurement of the second sensor being greater than or equal to the threshold magnetic field value, that the second sensor has reached a position of the third magnet.

4. The LIDAR assembly of claim 1, wherein the LIDAR assembly further comprises a fourth magnet and a fifth magnet, and wherein the processor is configured to execute the computer-executable instructions to:

receive from the first sensor, as the first portion and the second portion rotate relative to one another, a fourth magnetic field measurement associated with a fourth magnetic field of the fourth magnet;

receive, from the first sensor, a fifth magnetic field measurement associated with a fifth magnetic field of the fifth magnet from the first sensor; and calculate a rotational speed of the first portion relative to the second portion based on a first zero-crossing of the first magnetic field measurement and the second magnetic field measurement and a second zero-crossing of the fourth magnetic field measurement and the fifth magnetic field measurement.

5. The LIDAR assembly of claim 1, wherein the first magnet and second magnet are adjacent, and wherein the first magnetic field measurement and second magnetic field measurement produce a sine wave output by the first sensor.

6. The LIDAR assembly of claim 1, wherein the LIDAR assembly is a part of a LIDAR system, wherein the second portion is affixed to a vehicle, and wherein the first sensor is a Hall effect sensor.

7. A method comprising:
receiving from a first sensor, as a first portion of a LIDAR assembly rotates relative to a second portion of the LIDAR assembly, a first magnetic field measurement associated with a first magnetic field of a first magnet, wherein the first magnet is located on the second portion and arranged with a north pole of the first magnet facing a first radial direction, wherein a second magnet is located on the second portion and arranged with a south pole of the second magnet facing the first radial direction, wherein the first sensor is located on the first portion, wherein the first sensor is further configured to measure the first magnetic field of the first magnet and a second magnetic field of the second magnet as the first portion rotates relative to the second portion; receiving a second magnetic field measurement associated with the magnetic field of the second magnet from the first sensor; and calculating a position of the first sensor relative to the second portion based on the first magnetic field measurement and the second magnetic field measurement; and a third magnet, located on the second portion of the LIDAR assembly, the third magnetic magnet having a north pole that is facing a second direction, and wherein the second direction is orthogonally magnetic to the first radial direction; and a second sensor, located on the second portion of the LIDAR assembly, the second sensor being configured to measure a magnetic field of the third magnet.

8. The method of claim 7, wherein calculating a position of the first sensor relative to the second portion is further based on a zero-crossing data point in between the first magnetic field measurement and the second magnetic field measurement.

9. The method of claim 7, further comprising:
receiving a third magnetic field measurement from the second sensor based on proximity of the third magnetic field of the third magnet to the second sensor; and
comparing the third magnetic field measurement of the second sensor to a threshold magnetic field value; and
identifying, based on the third magnetic field measurement of the second sensor being greater than or equal to the threshold magnetic field value, that the second sensor has reached a position of the third magnet.

10. The method of claim 7, wherein the LIDAR assembly further comprises a fourth magnet and a fifth magnet, and wherein method further comprises:

receiving from the first sensor, as the first portion and the second portion rotate relative to one another, a fourth magnetic field measurement associated with a fourth magnetic field of the fourth magnet;

receiving, from the first sensor, a fifth magnetic field measurement associated with a fifth magnetic field of the fifth magnet from the first sensor; and calculating a rotational speed of the first portion relative to the second portion based on a first zero-crossing of the first magnetic field measurement and the second magnetic field measurement and a second zero-crossing of the fourth magnetic field measurement and the fifth magnetic field measurement.

11. The method of claim 7, wherein the first magnet and second magnet are adjacent, and wherein the first magnetic field measurement and second magnetic field measurement produce a sine wave output by the first sensor.

12. The method of claim 7, wherein the LIDAR assembly is a part of a LIDAR system, wherein the second portion is affixed to a vehicle, and wherein the first sensor is a Hall effect sensor.

13. A non-transitory computer readable medium including computer-executable instructions stored thereon, which when executed by one or more processors, cause the one or more processors to perform operations of:

receiving from a first sensor, as a first portion of a LIDAR assembly rotates relative to a second portion of the LIDAR assembly, a first magnetic field measurement associated with a first magnetic field of a first magnet, wherein the first magnet is located on the second portion and arranged with a north pole of the first magnet facing a first radial direction, wherein a second magnet is located on the second portion and arranged with a south pole of the second magnet facing the first radial direction, wherein the first sensor is located on the first portion, wherein the first sensor is further configured to measure the first magnetic field of the first magnet and a second magnetic field of the second magnet as the first portion rotates relative to the second portion;

receiving a second magnetic field measurement associated with the magnetic field of the second magnet from the first sensor; and calculating a position of the first sensor relative to the second portion based on the first magnetic field measurement and the second magnetic field measurement; and a third magnet, located on the second portion of the LIDAR assembly, the third magnetic magnet having a north pole that is facing a second direction, and wherein the second direction is orthogonally magnetic to the first radial direction; and a second sensor, located on the second portion of the LIDAR assembly, the second sensor being configured to measure a magnetic field of the third magnet.

14. The non-transitory computer readable medium of claim 13, wherein calculating a position of the first sensor relative to the second portion is further based on a zero-crossing data point in between the first magnetic field measurement and the second magnetic field measurement.

15. The non-transitory computer readable medium of claim 13, further comprising:

receiving a third magnetic field measurement from the second sensor based on proximity of the third magnetic field of the third magnet to the second sensor; and comparing the third magnetic field measurement of the second sensor to a threshold magnetic field value; and identifying, based on the third magnetic field measurement of the second sensor being greater than or equal to the threshold magnetic field value, that the second sensor has reached a position of the third magnet.

16. The non-transitory computer readable medium of claim 13, wherein the LIDAR assembly further comprises a fourth magnet and a fifth magnet, and wherein method further comprises:

receiving from the first sensor, as the first portion and the second portion rotate relative to one another, a fourth magnetic field measurement associated with a fourth magnetic field of the fourth magnet;

receiving, from the first sensor, a fifth magnetic field measurement associated with a fifth magnetic field of the fifth magnet from the first sensor; and calculating a rotational speed of the first portion relative to the second portion based on a first zero-crossing of the first magnetic field measurement and the second magnetic field measurement and a second zero-crossing of the fourth magnetic field measurement and the fifth magnetic field measurement.

17. The non-transitory computer readable medium of claim 13, wherein the first magnet and second magnet are adjacent, and wherein the first magnetic field measurement and second magnetic field measurement produce a sine wave output by the first sensor.

* * * * *